US012254840B2

(12) United States Patent
Ota

(10) Patent No.: US 12,254,840 B2
(45) Date of Patent: Mar. 18, 2025

(54) DA CONVERTER CIRCUIT, ELECTRO-OPTICAL DEVICE, AND ELECTRONIC APPARATUS

(71) Applicant: SEIKO EPSON CORPORATION, Tokyo (JP)

(72) Inventor: Hitoshi Ota, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/592,413

(22) Filed: Feb. 29, 2024

(65) Prior Publication Data

US 2024/0296798 A1 Sep. 5, 2024

(30) Foreign Application Priority Data

Mar. 2, 2023 (JP) ................................ 2023-031800

(51) Int. Cl.
*G09G 3/3275* (2016.01)
*G09G 3/3266* (2016.01)

(52) U.S. Cl.
CPC ......... *G09G 3/3266* (2013.01); *G09G 3/3275* (2013.01); *G09G 2300/0828* (2013.01); *G09G 2310/0289* (2013.01); *G09G 2310/08* (2013.01)

(58) Field of Classification Search
CPC .. G09G 3/3266; G09G 3/3275; G09G 3/3283; G09G 3/3291; G09G 2300/0828; G09G 2310/0289; G09G 2310/08
See application file for complete search history.

(56) References Cited

U.S. PATENT DOCUMENTS 8,519,990 B2 * 8/2013 Yamazaki ............ G09G 3/3688 345/98
2002/0163457 A1 11/2002 Azami et al.
2010/0039303 A1 2/2010 Tsukamoto
2012/0212357 A1 8/2012 Haneda et al.
2019/0280705 A1 9/2019 Bodnar et al.
2021/0327366 A1 * 10/2021 Maeda ................. G09G 3/3291

FOREIGN PATENT DOCUMENTS

JP 2000341125 12/2000
JP 2002190738 7/2002
JP 2010045723 2/2010
JP 2012175439 9/2012

(Continued)

*Primary Examiner* — Dennis P Joseph
(74) *Attorney, Agent, or Firm* — JCIPRNET

(57) ABSTRACT

A DA converter circuit includes an upper DA converter circuit that includes a first capacitance element including one end coupled to a data line and that outputs a voltage corresponding to five high-order bits to the data line, a lower DA converter circuit that includes a second capacitance element including one end coupled to a relay line and that outputs a voltage corresponding to five low-order bits to the relay line, and a capacitor including one end coupled to the relay line and the other end coupled to the data line. In the first capacitance element, an insulating layer is sandwiched between a first electrode and a second electrode. In the second capacitance element, an insulating layer is sandwiched between a third electrode and a fourth electrode. The insulating layer of the first capacitance element is thicker than the insulating layer of the second capacitance element.

8 Claims, 13 Drawing Sheets

(56) References Cited

FOREIGN PATENT DOCUMENTS

| | | |
|---|---|---|
| JP | 2012175440 | 9/2012 |
| JP | 2012182621 | 9/2012 |
| JP | 2013211651 | 10/2013 |
| JP | 2015092787 | 5/2015 |
| JP | 2015092788 | 5/2015 |
| JP | 2016105663 | 6/2016 |
| JP | 2021516497 | 7/2021 |

* cited by examiner

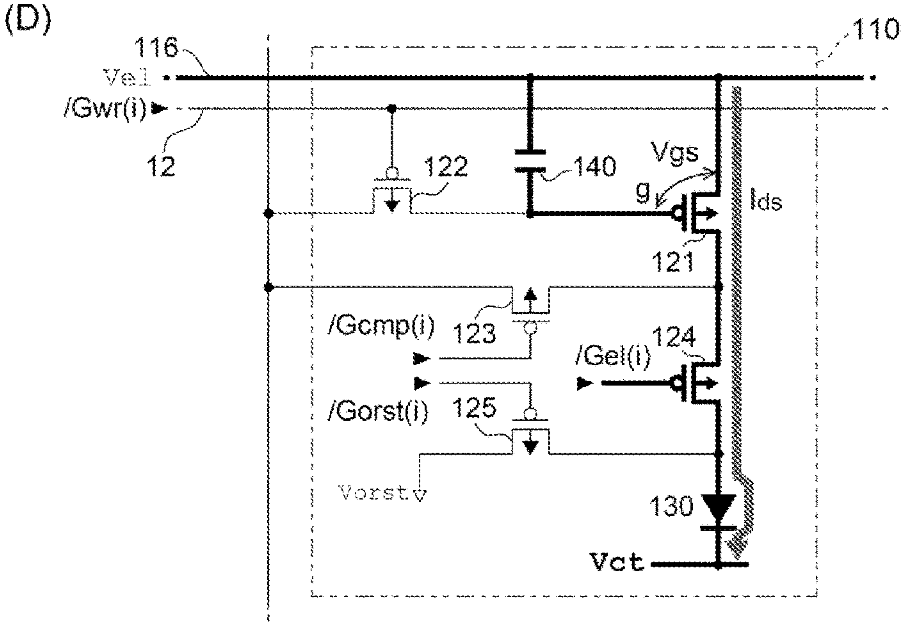
FIG. 10
| | EMBODIMENT | MODIFICATION 1 | MODIFICATION 2 |
|---|---|---|---|
| VH_H | 5.0V | 5.0V | 5.0V |
| VL_H | 1.5V | 0V | 1.8V |
| VH_L | 1.8V | 1.8V | 1.8V |
| VL_L | 0V | 0V | 0V |
FIG. 11
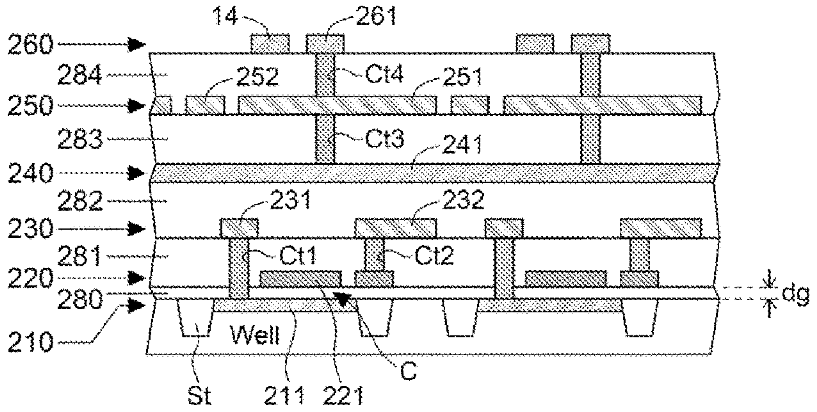
FIG. 12

DA CONVERTER CIRCUIT, ELECTRO-OPTICAL DEVICE, AND ELECTRONIC APPARATUS

The present application is based on, and claims priority from JP Application Serial Number 2023-031800, filed Mar. 2, 2023, the disclosure of which is hereby incorporated by reference herein in its entirety.

BACKGROUND

1. Technical Field

The present disclosure relates to, for example, a DA converter circuit, an electro-optical device, and an electronic apparatus.

2. Related Art

In recent years, electro-optical devices using light-emitting elements such as an Organic light-emitting diode (hereinafter referred to as an "OLED") elements have been proposed. An electro-optical device generally has a configuration in which pixel circuits each of which includes the above-described light-emitting element, a drive transistor, and the like are provided corresponding to intersections between scanning lines and data lines in a corresponding manner to pixels of an image to be displayed.

In such a configuration, when a data signal with a potential according to a gray scale level of the pixel is applied to a gate node of the drive transistor, the drive transistor supplies a current according to a voltage between the gate node and a source node to the light-emitting element. With this, the light-emitting element emits light at a brightness according to the gray scale level.

In other words, it is necessary to supply a potential corresponding to the gray scale level to the gate node of the drive transistor through the data line. Thus, data for specifying a gray scale level is converted into an analog signal by a DA converter circuit, and the converted potential is supplied to the data line. As the DA converter circuit, for example, there has been proposed a technique of providing a pair of a switch and a capacitance element that correspond to each bit and controlling charging/discharging of the capacitance element by using the switch, corresponding to each bit (for example, see JP-A-2000-341125).

In recent years, electro-optical devices have been required to be miniaturized and to have a higher resolution. Because of this, DA converter circuits have also been required to be miniaturized. However, in the above-described technique, there is a problem that miniaturization of a circuit area is difficult to be achieved because elements constituting the DA converter circuit are required to have a high withstand voltage.

SUMMARY

A DA converter circuit according to an aspect of the present disclosure includes a first DA converter circuit including a first capacitance element, the first DA converter circuit being configured to output a voltage corresponding to a high-order bit of a plurality of bits to a first data line, a second DA converter circuit including a second capacitance element, the second DA converter circuit being configured to output a voltage corresponding to a low-order bit of the plurality of bits to a second data line, and a coupling capacitor including one end coupled to the second data line and the other end coupled to the first data line. The first capacitance element includes a first electrode electrically coupled to the first data line, a second electrode, and a first insulating layer provided between the first electrode and the second electrode. The second capacitance element includes a third electrode electrically coupled to the second data line, a fourth electrode, and a second insulating layer provided between the third electrode and the fourth electrode and having a thickness smaller than a thickness of the first insulating layer.

BRIEF DESCRIPTION OF THE DRAWINGS

FIG. 10 is a diagram for describing an operation of the electro-optical device.

FIG. 11 is a diagram illustrating an example of power supply voltages in the electro-optical device.

FIG. 12 is a partial cross-sectional view illustrating an example of a capacitance element in the electro-optical device.

DESCRIPTION OF EMBODIMENTS

An electro-optical device according to an embodiment of the present disclosure will be described below with reference to the accompanying drawings.

Note that, in each of the drawings, dimensions and scale of each part are made different from actual ones as appropriate. Moreover, the embodiment, which will be described below, is a suitable specific example, and various technically preferable limitations are applied, but the scope of the disclosure is not limited to these modes unless they are specifically described in the following description as limiting the disclosure.

Figure 1:
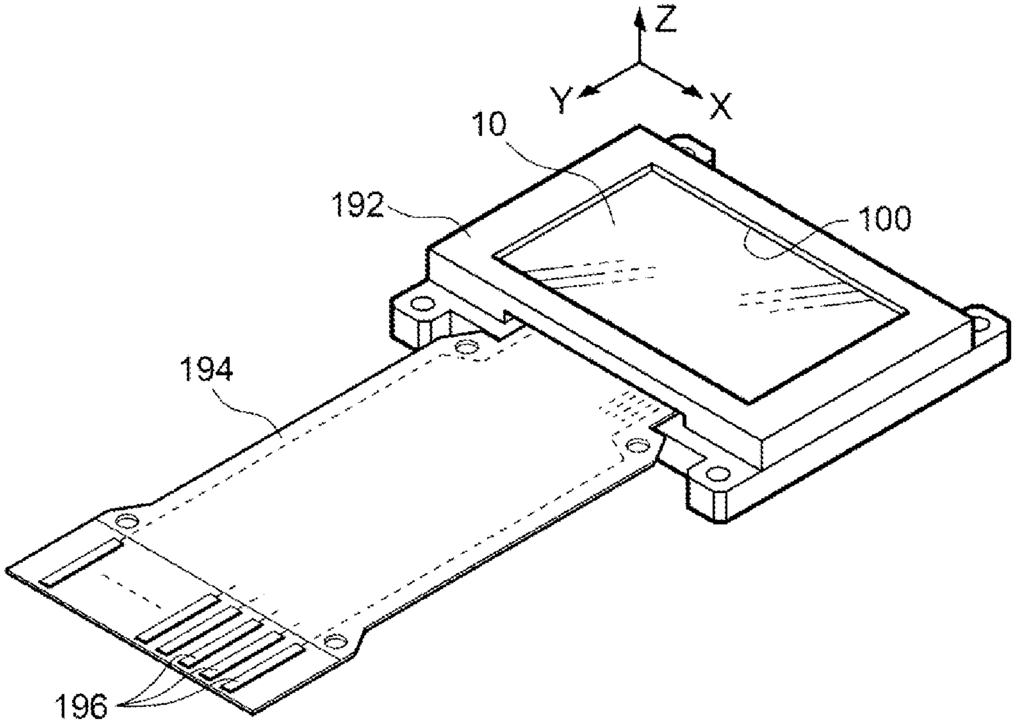
FIG. 1 is a perspective view illustrating an electro-optical device according to an embodiment.

FIG. 1 is a perspective view illustrating an electro-optical device 10 according to the embodiment. The electro-optical device 10 is a micro display panel that displays an image, for example, in a head-mounted display or the like. The electro-optical device 10 includes a pixel circuit including an OLED, a drive circuit that drives the pixel circuit, and the like. The pixel circuit, the drive circuit, and the like are integrated into a semiconductor substrate. The semiconductor substrate is typically a silicon substrate, but may be a different semiconductor substrate.

The electro-optical device 10 is accommodated in a frame-shaped case 192 that opens in a display region 100. The electro-optical device 10 is coupled to one end of an FPC substrate 194. FPC is an abbreviation for Flexible Printed Circuits. A plurality of terminals 196 that are coupled to a host device, which is not illustrated, are provided on the other end of the FPC substrate 194. When the plurality of terminals 196 are coupled to the host device, video data, synchronization signals, and the like are supplied from the host device to the electro-optical device 10 via the FPC substrate 194.

Note that, in the drawings, an X direction is an extension direction of a scanning line in the electro-optical device 10, and a Y direction is an extension direction of a data line. A two-dimensional plane defined in the X direction and the Y direction is a substrate surface of the semiconductor substrate. A Z direction is perpendicular to the X direction and the Y direction, and is an emission direction of light emitted from the OLED.

Figure 2:
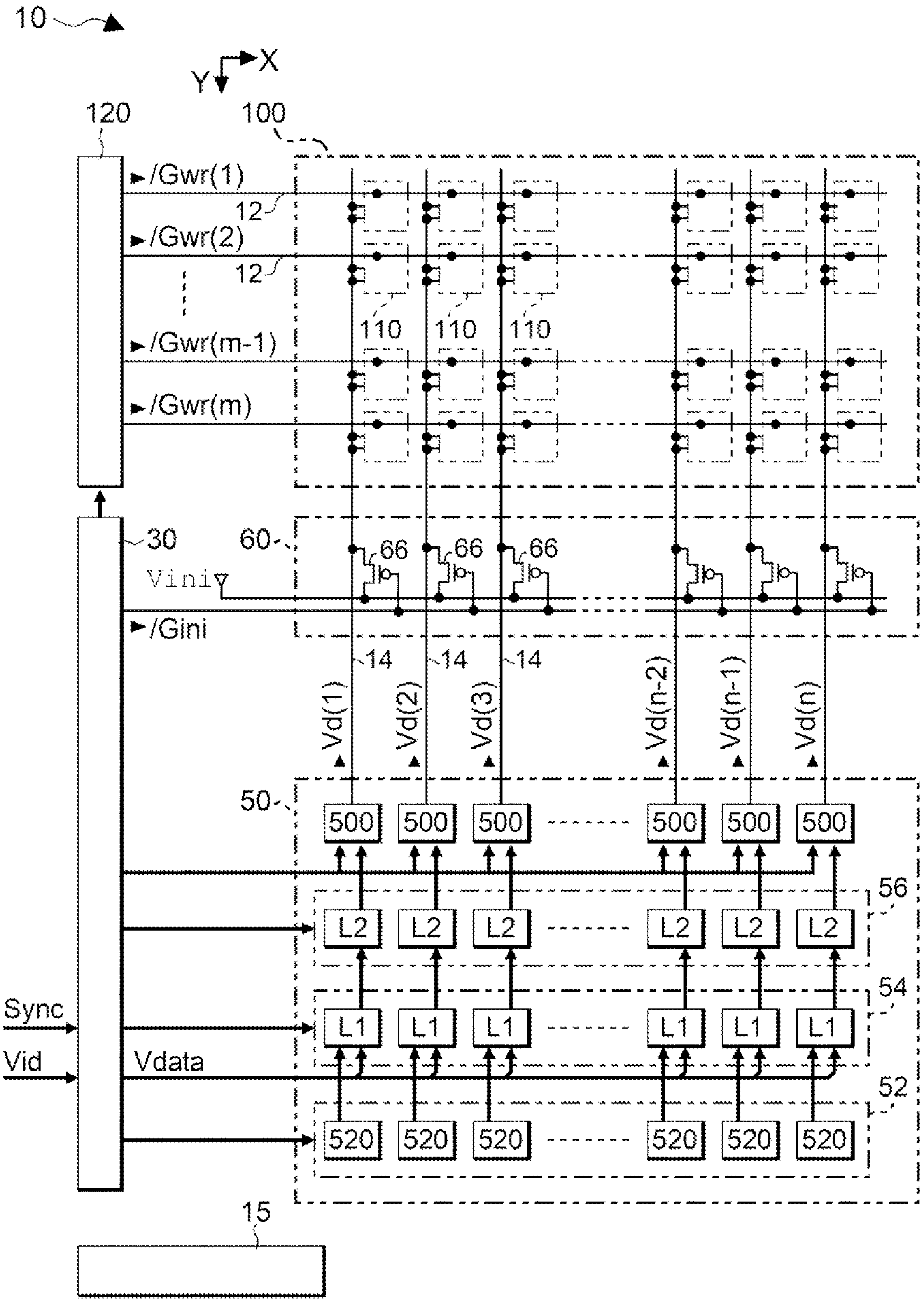
FIG. 2 is a block diagram illustrating an electrical configuration of the electro-optical device.

FIG. 2 is a block diagram illustrating an electrical configuration of the electro-optical device 10. As illustrated in the figure, the electro-optical device 10 includes a power supply circuit 15, a control circuit 30, a data signal output circuit 50, an initialization circuit 60, a display region 100, and a scanning line drive circuit 120.

In the display region 100, scanning lines 12 of m rows are provided along the X direction in the figure, and data lines 14 of n columns are provided along the Y direction in a manner to be electrically insulated from each of the scanning lines 12 in the figure. Note that each of m and n is an integer equal to or greater than 2.

In the display region 100, pixel circuits 110 are provided corresponding to intersections between the scanning lines 12 of the m rows and the data lines 14 of the n columns. Thus, the pixel circuits 110 are arrayed in a matrix shape including m rows vertically and n columns horizontally in the figure. To distinguish the rows from each other in the array of the matrix, the rows may be referred to as first, second, third . . . (m−1)-th, and m-th rows in order from the top in the figure. Similarly, to distinguish the columns from each other in the matrix, the columns may be referred to as first, second, third . . . (n−1)-th, and n-th columns in order from the left in the figure.

Note that an integer i equal to or more than 1 and equal to or less than m is used to generalize and describe the scanning lines 12. Similarly, in order to generalize and describe the data lines 14, an integer j equal to or more than 1 and equal to or less than n is used. The data line 14 corresponds to a "first data line" in the claims.

The control circuit 30 controls each portion, based on video data Vid and a synchronization signal Sync that are supplied from the host device. The video data Vid specifies, for example, a gray scale level of a pixel in an image to be displayed with 8 bits for each of three primary colors.

The synchronization signal Sync includes a vertical synchronization signal that instructs a start of vertical scanning of the video data Vid, a horizontal synchronization signal that instructs a start of horizontal scanning, and a dot clock signal that indicates a timing of one pixel of the video data.

Pixels of an image to be displayed in the present embodiment and the pixel circuits 110 in the display region 100 correspond one-to-one to each other. On the other hand, a characteristic of the brightness indicated by the gray scale level does not match a characteristic of the brightness of the pixel circuit 110 corresponding to the pixel, specifically, a characteristic of the brightness of the OLED included in the pixel circuit 110.

Thus, the control circuit 30 up-converts 8 bits of the video data Vid into, for example, 10 bits and outputs the up-converted data as video data Vdata that specifies a brightness of the OLED, in the present embodiment, and thus causes the OLED to emit light for the gray scale level specified by the video data Vid at the brightness corresponding to the gray scale level.

For such up-conversion, a look-up table is used in which a correspondence relationship between the 8 bits of the video data Vid being an input and the 10 bits of the video data Vdata being an output is stored in advance.

Further, the control circuit 30 generates various control signals to control each portion. Details thereof will be described later.

The scanning line drive circuit 120 is a circuit configured to drive the pixel circuits 110 arrayed in m rows and n columns row by row in accordance with the control by the control circuit 30, and outputs various types of signals. For example, the scanning line drive circuit 120 supplies scanning signals /Gwr(1), /Gwr(2) . . . /Gwr(m−1), and /Gwr(m) to the scanning lines 12 of first, second, third . . . (m−1)-th, and m-th rows in order. Generally, the scanning signal supplied to the scanning line 12 in the i-th row is denoted as /Gwr(i).

Note that the scanning line drive circuit 120 outputs various control signals in addition to the scanning signals/Gwr(1) to /Gwr(m). Details thereof will be described later.

The data signal output circuit 50 is a circuit that outputs data signals having potentials corresponding to brightness to the pixel circuits 110 positioned in a row selected by the scanning line drive circuit 120.

In detail, the data signal output circuit 50 includes a selection circuit group 52, a first latch circuit group 54, a second latch circuit group 56, and n DA converter circuits 500. The selection circuit group 52 includes a selection circuit 520 corresponding to each of the n columns, the first latch circuit group 54 includes a first latch circuit L1 corresponding to each of the n columns, and the second latch circuit group 56 includes a second latch circuit L2 corresponding to each of the n columns.

That is, a set of the selection circuit 520, the first latch circuit L1, the second latch circuit L2, and the DA converter circuit 500 is provided corresponding to each column. Here, the selection circuit 520 in the j-th column instructs the first latch circuit L1 in the j-th column to select the video data of the j-th column of the video data Vdata output from the control circuit 30, and the first latch circuit L1 of the j-th column latches the video data Vdata in accordance with the instruction. The second latch circuit L2 in the j-th column outputs the video data Vdata latched by the first latch circuit L1 in the j-th column to the DA converter circuit 500 in the j-th column in a writing period, which will be described later, under the control of the control circuit 30.

The DA converter circuit 500 in the j-th column converts the video data Vdata output from the second latch circuit L2 in the j-th column into an analog signal, and outputs the converted signal as a data signal to the data line 14 in the j-th column. Note that the DA converter circuit 500 will be described later in detail.

The initialization circuit 60 is an aggregate of transistors 66 corresponding one-to-one to the data lines 14. A source node of the transistor 66 corresponding to the j-th column is coupled to a power supplying line with a potential Vini, and a drain node of the transistor 66 is coupled to the data line 14 in the j-th column. Additionally, a control signal/Gini by the control circuit 30 is commonly supplied to gate nodes of the transistors 66 in the respective columns.

The potentials of the data lines 14 in the first, second, (n−1)-th, and n-th columns are denoted by Vd(1), Vd(2) . . . . Vd(n−1), and Vd(n) in this order. Generally, a potential of the data line 14 in the j-th column is denoted as Vd(j).

The power supply circuit 15 generates various potentials to be used in the electro-optical device 10. Examples of the various potentials include power supply voltages in the scanning line drive circuit 120 and the data signal output circuit 50, and potentials Vel, Vini, Vorst, Vrst, Vct, VH_H, VL_H, VH_L, VL_L, and the like.

Figure 3:
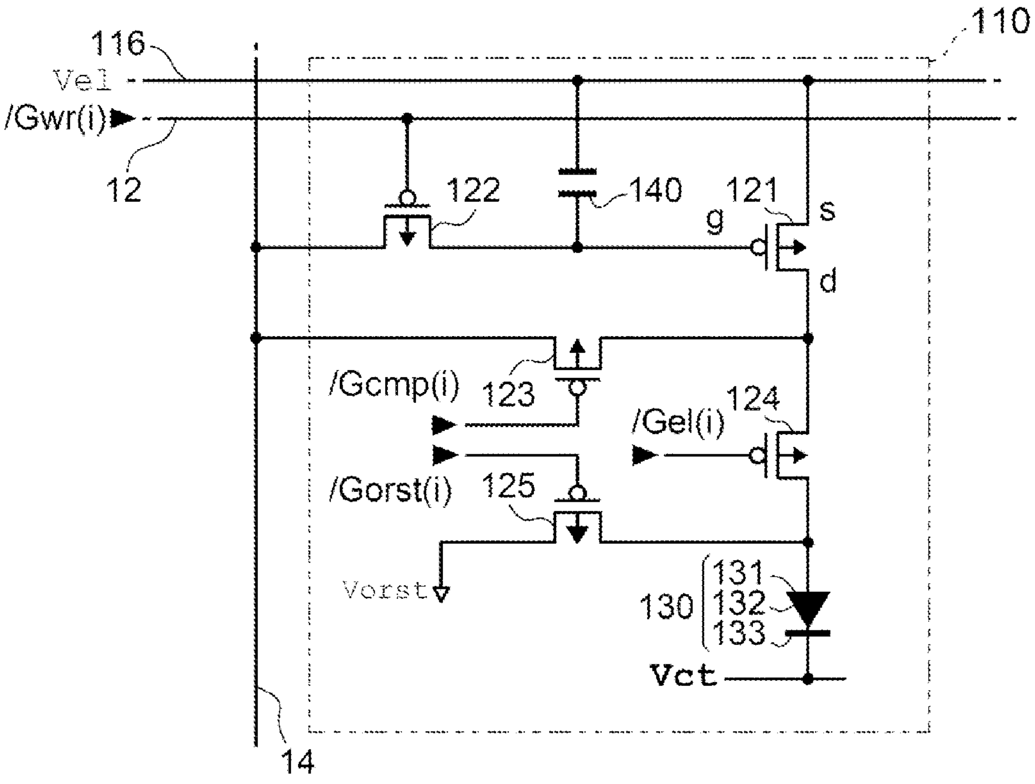
FIG. 3 is a circuit diagram illustrating a pixel circuit in the electro-optical device.

FIG. 3 is a circuit diagram illustrating the pixel circuit 110. The pixel circuits 110 arrayed in the m rows and the n columns are electrically identical to each other. Thus, the pixel circuit 110 will be described with the pixel circuit 110 positioned at the i-th row and the j-th column as a representative.

As illustrated in the figure, the pixel circuit 110 includes an OLED 130, transistors 121 to 125 of a p-type, and a capacitance element 140. The transistors 121 to 125 are of a MOS type, for example. Note that MOS is an abbreviation for Metal-Oxide-Semiconductor field-effect transistor.

Further, in addition to the scanning signal /Gwr(i), control signals /Gel(i), /Gcmp(i), and /Gorst(i) are supplied from the scanning line drive circuit 120 to the pixel circuit 110 in the i-th row.

The control signal /Gel(i) is denoted to generalize the control signals /Gel(1), /Gel(2) . . . /Gel(m−1), and /Gel(m) that are sequentially supplied corresponding to the first, second . . . (m−1)-th, and m-th rows. Similarly, the control signal /Gcmp(i) is denoted to generalize the control signals/ Gcmp(1), /Gcmp(2) . . . /Gcmp(m−1), and /Gcmp(m) that are sequentially supplied corresponding to the first, second . . . (m−1)-th, and m-th rows. The control signal /Gorst(i) is similarly denoted to generalize the control signals /Gorst(1), /Gorst(2) . . . /Gorst(m−1), and /Gorst(m) that are sequentially supplied corresponding to the first, second . . . (m−1)-th, and m-th rows.

The OLED 130 is a light-emitting element in which a light emission function layer 132 is sandwiched between a pixel electrode 131 and a common electrode 133. The pixel electrode 131 serves as an anode, and the common electrode 133 serves as a cathode. Note that the common electrode 133 has semi-transmissive and semi-reflective properties.

In the OLED 130, when a current flows from the anode to the cathode, holes injected from the anode and electrons injected from the cathode are recombined in the light emission function layer 132 to generate excitons, and white light is generated.

For color display, the generated white light resonates in an optical resonator configured of a reflective electrode and a pixel electrode having semi-reflective and semi-transmissive properties, which are omitted in illustration, and is emitted at a resonant wavelength set corresponding to any of red (R), green (G), and blue (B). A color filter corresponding to the color is provided on the emission side of the light from the optical resonator. Thus, the emitted light from the OLED 130 is visually recognized by an observer through coloration by the optical resonator and the color filter.

Note that the optical resonator is omitted in illustration. Further, when the electro-optical device 10 simply displays a monochrome image with only brightness variations, the above-mentioned color filter may be omitted.

In the transistor 121 of the pixel circuit 110 at the i-th row and the j-th column, a gate node g is coupled to a drain node of the transistor 122, a source node s is coupled to a power supplying line 116 of a potential Vel, and a drain node d is coupled to a source node of the transistor 123 and a source node of the transistor 124. In the capacitance element 140, one end thereof is coupled to the gate node g of the transistor 121, and the other end thereof is coupled to the power supplying line 116. Thus, the capacitance element 140 holds a voltage between the gate node g and the source node s of the transistor 121.

Note that the other end of the capacitance element 140 may be coupled to a power supplying line with a substantially constant voltage other than the power supplying line 116.

In the present embodiment, as the capacitance element 140, for example, a so-called MOS capacitor formed by sandwiching a gate insulating layer of the transistor between a semiconductor layer and a gate electrode layer of the transistor is used. Note that, as the capacitance element 140, a parasitic capacitor of the gate node g of the transistor 121 may be used, and a so-called Metal-Insulator-Metal (MIM) capacitor formed by sandwiching an insulating layer between mutually different electrodes in the semiconductor substrate may be used.

In the transistor 122 of the pixel circuit 110 at the i-th row and the j-th column, a gate node is coupled to the scanning line 12 in the i-th row, and a source node is coupled to the data line 14 in the j-th column. In the transistor 123 of the pixel circuit 110 at the i-th row and the j-th column, a control signal /Gcmp(i) is supplied to a gate node thereof, and a drain node thereof is coupled to the data line 14 in the j-th column. In the transistor 124 of the pixel circuit 110 at the i-th row and the j-th column, the control signal /Gel(i) is supplied to a gate node thereof, and a drain node thereof is coupled to the pixel electrode 131 serving an anode of the OLED 130 and a drain node of the transistor 125.

In the transistor 125 of the pixel circuit 110 at the i-th row and the j-th column, the control signal /Gorst(i) is supplied to a gate node thereof, and a source node thereof is coupled to the power supplying line of the potential Vorst.

Note that the potential Vorst is, for example, a potential Gnd that is a reference of a voltage of 0 or a low potential close to the potential Gnd. To be more specific, the potential Vorst is a potential of a degree that no current flows in the OLED 130 when the potential Vorst is applied to the pixel electrode 131 in the OLED 130.

Further, the common electrode 133 that serves as a cathode of the OLED 130 is supplied with the potential Vct.

Figure 4:
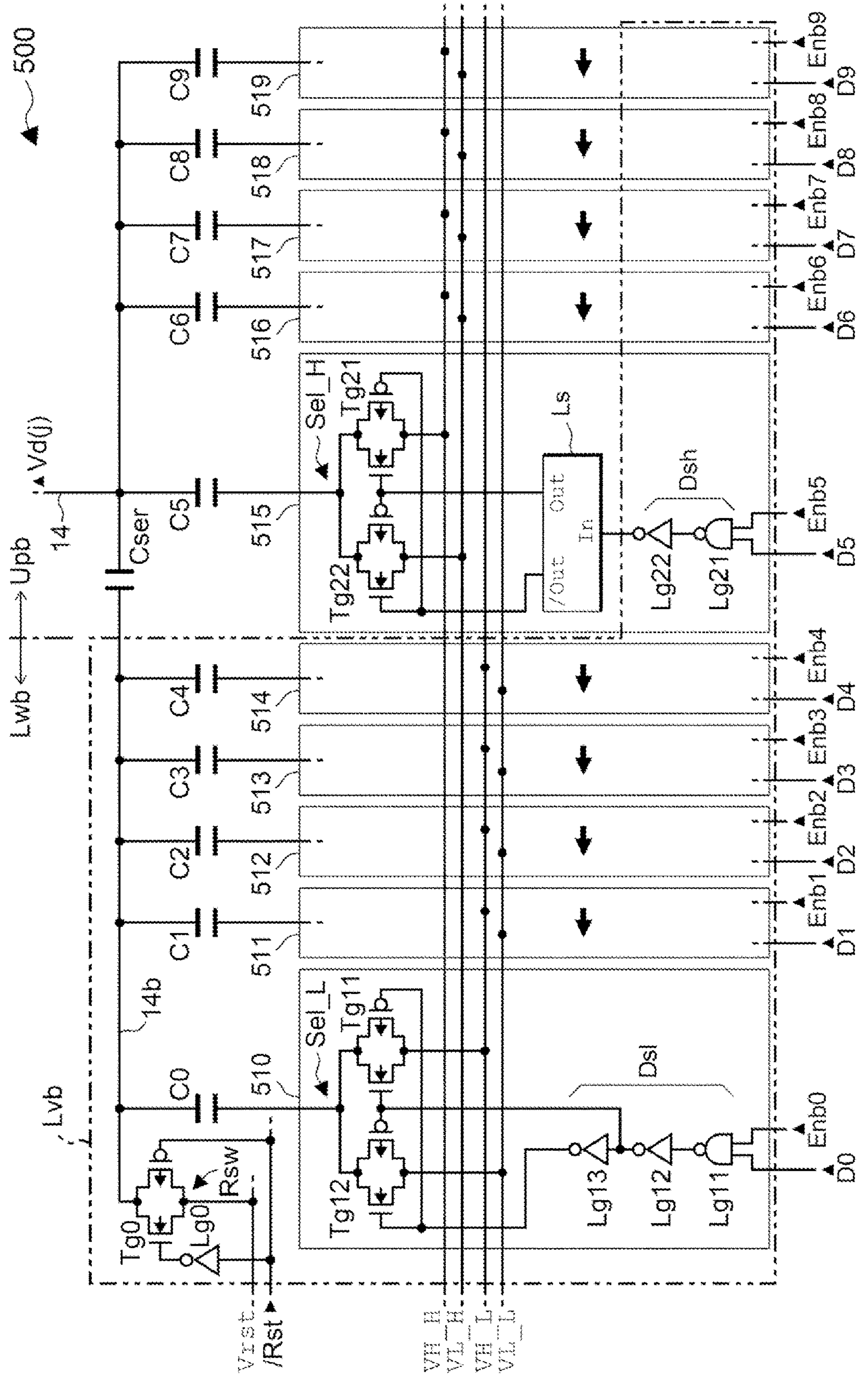
FIG. 4 is a circuit diagram of a DA converter circuit in a data signal output circuit.

FIG. 4 is a circuit diagram illustrating the DA converter circuit 500 corresponding to the j-th column.

To the DA converter circuit 500 in the j-th column, bits D0 to D9 are supplied from the second latch circuit L2 in the j-th column, and control signals Enb0 to Enb9 and a control signal /Rst are supplied from the control circuit 30. In addition, the potentials Vrst, VH_H, VL_H, VH_L, and VL_L are supplied from the power supply circuit 15 to the DA converter circuit 500 in the j-th column.

Note that in the present embodiment, the potentials VH_H, VL_H, VH_L, and VL_L are set as follows:

VH_H>VL_H, and VH_L>VL_L.

The details will be described later.

The bits D0 to D9 are 10 bits of video data output from the second latch circuit L2 in the j-th column. Of the 10 bits, the least significant bit is DO, weights sequentially increase from the bit DO to D1, D2 . . . and the most significant bit is D9.

The control signals Enb0 to Enb9 are signals for sequentially specifying timings of capturing the bits D0 to D9. The control signal /Rst is a signal for resetting the capacitance element.

As illustrated in the figure, the DA converter circuit 500 includes capacitance elements C0 to C9 and Cser, a switch Rsw, and selection circuits 510 to 519. The capacitance elements C0 to C9 and the selection circuits 510 to 519 form pairs, which will be described later, corresponding to the respective bits. In detail, the selection circuit 510 and the capacitance element C0 form a pair corresponding to the bit D0, and the selection circuit 511 and the capacitance element C1 form a pair corresponding to the bit D1. The same applies thereafter, and the selection circuit 519 and the capacitance element C9 form a pair corresponding to the bit D9.

The selection circuits 510 to 514 select the potential VH_L or VL_L, and supply the selected potential to one end of the corresponding capacitance element. Each of the selection circuits 515 to 519 selects the potential VH_H or VL_H and supplies the selected potential to one end of the corresponding capacitance element.

For example, the selection circuit 510 corresponding to the bit D0 captures the bit D0 at a timing specified by the control signal Enb0, selects the potential VH_L or VL_L according to a logic level of the captured bit D0, and supplies the selected potential to one end of the capacitance element C0. Further, for example, the selection circuit 516 corresponding to the bit D6 captures the bit D6 at a timing specified by the control signal Enb6, selects the potential VH_H or VL_H according to a logic level of the captured bit D6, and supplies the selected potential to one end of the capacitance element C6.

Note that in the present embodiment, of the 10 bits of the video data Vdata, the bits D5 to D9 are examples of the high-order bits, and the bits D0 to D4 are examples of all bits except the high-order bits.

Capacitance values of the capacitance elements C0 to C9 are set at the following ratios in the present embodiment. In detail, when the capacitance value of the capacitance element C0 is "1", the capacitance values of the capacitance elements C1, C2, C3, and C4 are "2", "4", "8", and "16", respectively in this order.

In addition, when the capacitance value of the capacitance element C5 is "ka" that means ka times the capacitance value of the capacitance element C0, the capacitance values of the capacitance elements C6, C7, C8, and C9 are "2 ka", "4 ka", "8 ka", and "16 ka", respectively in this order.

Note that the capacitance values of the capacitance elements C0 to C9 and Cser can be permitted to include a certain degree of error as long as the linearity of the output voltage corresponding to a gray scale level is maintained. In addition, in the present embodiment, a MOS capacitor is used as the capacitance element 140. Thus, MOS capacitors may also be used as the capacitance elements C0 to C9 and Cser.

Of the capacitance elements C0 to C9, the other ends of the capacitance elements C0 to C4 corresponding to the five low-order bits are electrically coupled to one end of the capacitance element Cser. For the sake of convenience, a coupling line between the other ends of the capacitance elements C0 to C4 and the one end of the capacitance element Cser is regarded as a relay line 14*b*. Additionally, of the capacitance elements C0 to C9, the other ends of the capacitance elements C5 to C9 corresponding to the five high-order bits are electrically coupled to the other ends of the data line 14 and the capacitance element Cser. Note that the relay line 14*b* corresponds to a "second data line" in the claims.

In the present description, "electrically coupled" or simply "coupled" means direct or indirect coupling or binding between two or more elements, and includes, for example, a case where two or more elements are not directly coupled to each other at the semiconductor substrate through a different wiring line layer and a contact hole.

In addition, one end and the other end of each of the capacitance elements Cser and C0 to C9 are merely convenient names. Thus, for example, the one end of the capacitance element C0 is sometimes referred to as the other end of the capacitance element C0.

The switch Rsw becomes in an on state or an off state according to the control signal /Rst between the power supplying line at the potential Vrst and the relay line 14*b*. In detail, when the control signal /Rst is at a L level, the switch Rsw becomes in the on state. When the control signal /Rst is at a H level, the switch Rsw becomes in the off state. In the present description, an "on state" of a switch or transistor means that a state between both ends of the switch or between a source node and a drain node of the transistor is electrically closed to be in a low impedance state. Also, an "off state" of a switch or transistor means that a state between both ends of the switch or between a source node and a drain node is electrically opened to be in a high impedance state.

To be specific, the switch Rsw may be constituted by a NOT circuit Lg0 that outputs a negative signal of the control signal /Rst, and a transmission gate Tg0. The transmission gate Tg0 is an analog switch obtained by combining an n-channel transistor whose gate node is supplied with a negative signal from the NOT circuit Lg0 and a p-channel transistor whose gate node is supplied with the control signal /Rst.

The selection circuit 510 that is paired with the capacitance element C0 and that corresponds to the bit D0 includes a logic circuit Dsl and a selector Sel_L.

The logic circuit Dsl outputs a logical product signal and a negative logical product signal of the bit D0 of the video data Vdata output from the second latch circuit L2 in the j-th column and the control signal Enb0. The logic circuit Dsl actually includes, for example, a NAND circuit Lg11 that outputs a negative logical product signal of the bit D0 and the control signal Enb0, a NOT circuit Lg12 that inverts a logic level of the negative logical product signal and that outputs the inverted signal as a logical product signal, and a NOT circuit Lg13 that re-inverts the logic level of the signal output from the NOT circuit Lg12 and that outputs the re-inverted signal as a negative logical product signal.

The selector Sel_L in the selection circuit 510 selects the potential VH_L when a logical product signal from the logic circuit Dsl is at a H level (a negative logical product signal is at a L level), selects the potential VL_L when the logical product signal from the logic circuit Dsl is at a L level (the negative logical product signal is at a H level), and then supplies the selected potential to the one end of the capacitance element C0.

To be specific, the selector Sel_L includes a transmission gate Tg11 including an input terminal coupled to the power supplying line of the potential VH_L and an output terminal coupled to the one end of the capacitance element C0, and a transmission gate Tg12 including an input terminal coupled to the power supplying line of the potential VL_L and an output terminal coupled to the one end of the capacitance element C0. Note that when the logical product signal from the logic circuit Dsl is at the H level, the transmission gate Tg11 is turned on and the transmission gate Tg12 is turned off. On the other hand, when the logical product signal from the logic circuit Dsl is at the L level, the transmission gate Tg11 is turned off and the transmission gate Tg12 is turned on.

The other selection circuits 511 to 514 have a configuration similar to that of the selection circuit 510 except that relationships between the bits D1 to D4 of an input signal and the control signals Enb1 to Enb4 are different.

The selection circuit 515 that is paired with the capacitance element C5 and that corresponds to the bit D5 includes a logic circuit Dsh, a level shifter Ls, and a selector Sel_H.

The logic circuit Dsh outputs a logical product signal of the bit D5 of the video data Vdata output from the second latch circuit L2 in the j-th column and the control signal Enb5. The logic circuit Dsh is actually constituted by, for example, a NAND circuit Lg21 that outputs a negative logical product signal of the bit D5 and the control signal Enb5, and a NOT circuit Lg22 that outputs a negative signal of the negative logical product signal as the logical product signal described above.

The level shifter Ls is input with a logical product signal having a low amplitude from the logic circuit Dsh at an input terminal In, converts the input logical product signal having the low amplitude into a logical product signal having a high amplitude, and outputs the converted logical product signal having the high amplitude. Specifically, the level shifter Ls converts a logical product signal having a low amplitude from the logic circuit Dsh into a logical product signal having a high amplitude, outputs a non-inverted signal in which a logic level of the logical product signal is maintained from an output terminal Out, and outputs an inverted signal in which the logic level of the logical product signal is inverted from an output terminal /Out.

The selector Sel_H in the selection circuit 515 selects the potential VH_H when the non-inverted signal output from the output terminal Out of the level shifter Ls is at the H level (the inverted signal output from the output terminal /Out is at the L level), selects the potential VL_H when the non-inverted signal is at the L level (the inverted signal is at the H level), and then supplies the selected potential to the one end of the capacitance element C5.

To be more specific, the selector Sel_H is constituted by a transmission gate Tg21 including an input terminal coupled to the power supplying line of the potential VH_H and an output terminal coupled to the one end of the capacitance element C5, and a transmission gate Tg22 including an input terminal coupled to the power supplying line of the potential VL_H and an output terminal coupled to the one end of the capacitance element C5. Note that when the non-inverted signal output from the output terminal Out of the level shifter Ls is at the H level, the transmission gate Tg21 is turned on and the transmission gate Tg22 is turned off. On the other hand, when the non-inverted signal is at the L level, the transmission gate Tg21 is turned off and the transmission gate Tg22 is turned on.

The other selection circuits 516 to 519 have a configuration similar to that of the selection circuit 515 except that relationships between the bits D6 to D9 of an input signal and the control signals Enb6 to Enb9 are different.

Figure 5:
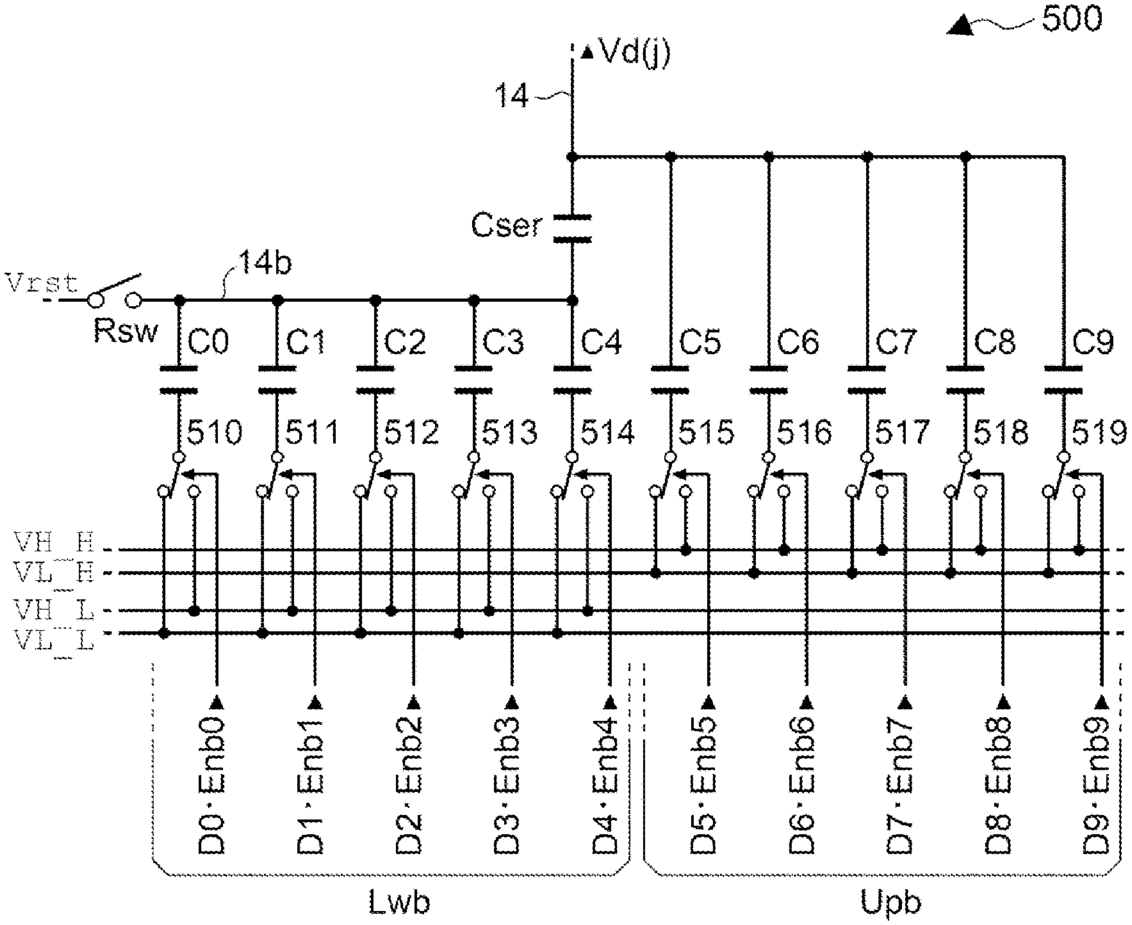
FIG. 5 is a diagram simply illustrating the circuit of the DA converter circuit.

FIG. 5 is a diagram illustrating an equivalent circuit of the DA converter circuit 500 in the j-th column.

The selection circuit 510 is represented as a single-pole double-throw switch that selects the potential VH_L or VL_L according to a logic level of a logical product signal D0·Enb0 of the bit D0 and the control signal Enb0. As in the selection circuit 510, the selection circuits 511 to 514 are also represented as single-pole double-throw switches that select the potential VH_L or VL_L.

The selection circuit 515 is represented as a single-pole double-throw switch that selects the potential VH_H or VL_H according to a logic level of a logical product signal D5·Enb5 of the bit D5 and the control signal Enb5. As in the selection circuit 515, the selection circuits 516 to 519 are also represented as single-pole double-throw switches that select the potential VH_H or VL_H.

In FIG. 4 and FIG. 5, description is made about the DA converter circuit 500 in the j-th column. The DA converter circuits 500 corresponding to the other columns have similar configurations.

An operation of the DA converter circuit 500 is divided into a reset period and an output period. Note that the reset period of the DA converter circuit 500 corresponds to an initialization period (A) and a compensation period (B) in a horizontal scanning period of the electro-optical device 10, which will be described later, and the output period of the DA converter circuit 500 corresponds to a writing period (C) in the horizontal scanning period of the electro-optical device 10.

In the DA converter circuit 500, the switch Rsw is turned on in the reset period, and the selection circuits 510 to 514 select the potential VL_L. Thus, in the reset period, each of the capacitance elements C0 to C4 is charged with a voltage corresponding to a difference between the potential Vrst and the potential VL_L. In addition, in the reset period, the selection circuits 515 to 519 select the potential VL_H. At the end of the reset period (compensation period), the data line 14 has an equivalent potential to a threshold value, which will be described later, in the electro-optical device 10. Thus, in the reset period, each of the capacitance elements C5 to C9 is charged with a voltage corresponding to a difference between the equivalent potential to the threshold value and the potential VL_H.

To put it simply, in the reset period, electric charges according to the capacitance values are accumulated in the capacitance elements C0 to C9.

In the DA converter circuit 500, in the output period, the selection circuits 510 to 514 select the potential VL_L when the corresponding logical product signal is at the L level, and select the potential VH_L when the corresponding logical product signal is at the H level. Further, in the output period, the selection circuits 515 to 519 select the potential VL_H when the corresponding logical product signal is at the L level, and select the potential VH_H when the corresponding logical product signal is at the H level. As will be described later, since the control signals Enb0 to Enb9 are at the H level at the end of the output period, the selection circuits 510 to 514 sequentially select the potential VL_L or VH_L according to the bits D0 to D4, and the selection circuits 515 to 519 sequentially select the potential VL_H or VH_H according to the bits D5 to D9.

In other words, in the output period, a potential at the one end of each of the capacitance elements C0 to C9 is changed (increased) or maintained according to the corresponding bit of the bits D0 to D9.

The capacitance elements C5 to C9 corresponding to the high-order bits act to increase the potential of the data line 14 according to the respective capacitance values and a potential rise amount (VH_H−VL_H). The other ends of the capacitance elements C0 to C4 corresponding to the low-order bits act to increase the potential of the relay line 14*b* according to the respective capacitance values and the potential rise amount (VH_L−VL_L). However, the relay line 14*b* that is the other ends of the capacitance elements C0 to C4 is coupled to the data line 14 via the capacitance element Cser. Thus, a potential change in the relay line 14*b* is compressed with a ratio determined by the capacitance elements C0 to C4 and Cser, which changes the potential of the data line 14. The ratio is denoted as a compression ratio kn. The compression ratio kn is expressed by using the following Equation (1).

$$kn = Cser/(Cser + C0 + C1 + C2 + C3 + C4) \quad (1)$$

Note that, in the present embodiment, the compression ratio kn is 1/32 (=1/(1+1+2+4+8+16)).

A potential rise amount (VH_H−VL_H) corresponding to the high-order bits and a potential rise amount (VL_H−VL_L) corresponding to the low-order bits have a relationship as represented by the following Equation (2).

$$(VH\_H - VL\_H)/ka = (VL\_H - VL\_L) \quad (2)$$

In other words, the potential rise amount corresponding to the high-order bits is 1/Ka times the potential rise amount corresponding to the low-order bits. On the other hand, the capacitance values of the capacitance elements C5 to C9 corresponding to the high-order bits are Ka times the capacitance values of the capacitance elements C0 to C4 corresponding to the low-order bits in this order, respectively. Thus, the weights given by the bits D0 to D4 to the potential change of the relay line 14*b* are “1”, “2”, “4”, “8”, and “16” in this order, respectively. The weights given by the bits D5 to D9 to the potential change of the data line 14 are also “1”, “2”, “4”, “8”, and “16” in this order, respectively. However, the potential change of the relay line 14*b* is compressed at the compression ratio kn (=1/32), and propagates to the data line 14. Thus, the weights given to the potential change of the data line 14 by the bits D0 to D9 are “1”, “2”, “4”, “8”, “16”, “32”, “64”, “128”, “256”, and “512” in this order, respectively.

Thus, the DA converter circuit 500 linearly changes the potential of the data line 14 from the potential at the end of the reset period according to the weights of the bits D0 to D9.

Note that the capacitance elements C5 to C9 and the selection circuits 515 to 519 change the potential of the data line 14 by an amount corresponding to the high-order bits D5 to D9 of the 10 bits of the video data Vdata, that is, output a voltage corresponding to the bits D5 to D9 to the data line 14. Thus, a circuit including the capacitance elements C5 to C9 and the selection circuits 515 to 519 is referred to as an upper DA converter circuit Upb.

Similarly, the capacitance elements C0 to C4 and the selection circuits 510 to 514 change the potential of the relay line 14*b* by an amount corresponding to the lower bits D0 to D4 of the 10 bits of the video data Vdata, that is, output a voltage corresponding to the bits D0 to D4 to the relay line 14*b*. Thus, a circuit including the capacitance elements C0 to C4 and the selection circuits 510 to 514 is referred to as a lower DA converter circuit Lwb. Note that the potential change of the relay line 14*b* is compressed at the compression ratio kn (=1/32) and propagates to the data line 14.

Figure 6:
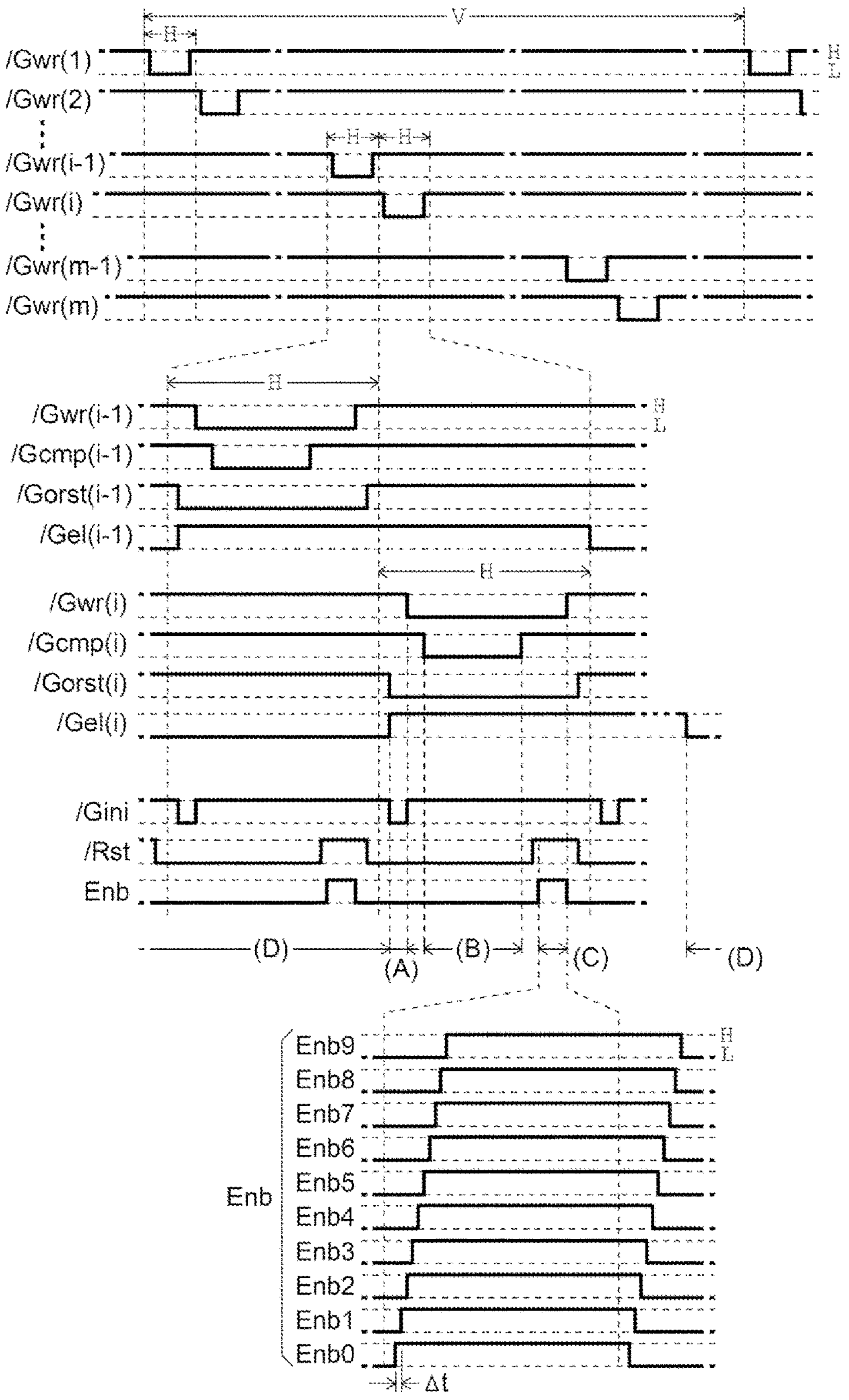
FIG. 6 is a timing chart illustrating an operation of the electro-optical device.

FIG. 6 is a timing chart for describing an operation of the electro-optical device 10.

In the electro-optical device 10, the scanning lines 12 of m rows are scanned one by one in the order of first, second, third . . . and m-th rows in one frame (V). Specifically, as illustrated in the figure, the scanning signals /Gwr(1), /Gwr(2) . . . /Gwr(m−1), and /Gwr(m) are successively and exclusively set to an L level for each horizontal scanning period (H) by the scanning line drive circuit 120.

In the present embodiment, a period in which the adjacent scanning signals of the scanning signals /Gwr(1) to/Gwr(m) are set to the L level is temporally isolated. Specifically, after the scanning signal /Gwr(i−1) changes from the L level to a H level, the next scanning signal /Gwr(i) is set to the L level after a period. This period corresponds to a horizontal retrace period.

In the present description, the frame (V) refers to a period required to display one frame of an image specified by the video data Vid. When a time length of the one frame (V) is the same as a vertical synchronization period, for example, when a frequency of a vertical synchronization signal included in the synchronization signal Sync is 60 Hz, the time length is 16.7 milliseconds corresponding to one cycle of the vertical synchronization signal. In addition, the horizontal scanning period (H) is a time interval in which the scanning signals/Gwr(1) to /Gwr(m) are set to the L level in order. Note that in the figure, for convenience, a start timing of the horizontal scanning period (H) is substantially at the center of the horizontal retrace period.

In the present embodiment, the horizontal scanning period (H) is divided mainly into three periods including an initialization period (A), a compensation period (B), and a writing period (C). Further, as an operation of the pixel circuit 110, a light-emitting period (D) is further added in addition to the above-mentioned three periods.

In the initialization period (A) of each horizontal scanning period (H), the control signal /Gini is at the L level, the control signal /Rst is at the L level, and the control signal Enb is at the L level. Note that the control signal Enb is a signal that collectively refers to the control signals Enb0 to Enb9. Although the phases of the control signals Enb0 to Enb9 are sequentially shifted in the writing period (C) as will be described later, the control signals Enb0 to Enb9 have the same waveform except for the writing period (C). Thus, the control signals Enb0 to Enb9 are collectively referred to as the control signal Enb.

In the compensation period (B), the control signal/Gini is at the H level, and the control signals /Rst and Enb are maintained at the L level.

In the writing period (C), the control signal /Gini is maintained at the H level, and the control signals /Rst and Enb are at the H level.

Operations in the horizontal scanning period (H) will be described using the i-th row as an example. Further, as for the pixel circuit 110, the pixel circuit 110 at the i-th row and the j-th column will be described as an example.

In the horizontal scanning period (H) of the i-th row, before the scanning signal /Gwr(i) becomes at the L level, the initialization period (A) of the i-th row starts. The initialization period (A) is a period for resetting a voltage or an electric charge remaining in each portion as for the horizontal scanning period (H) of the (i−1)-th row.

Figure 7:
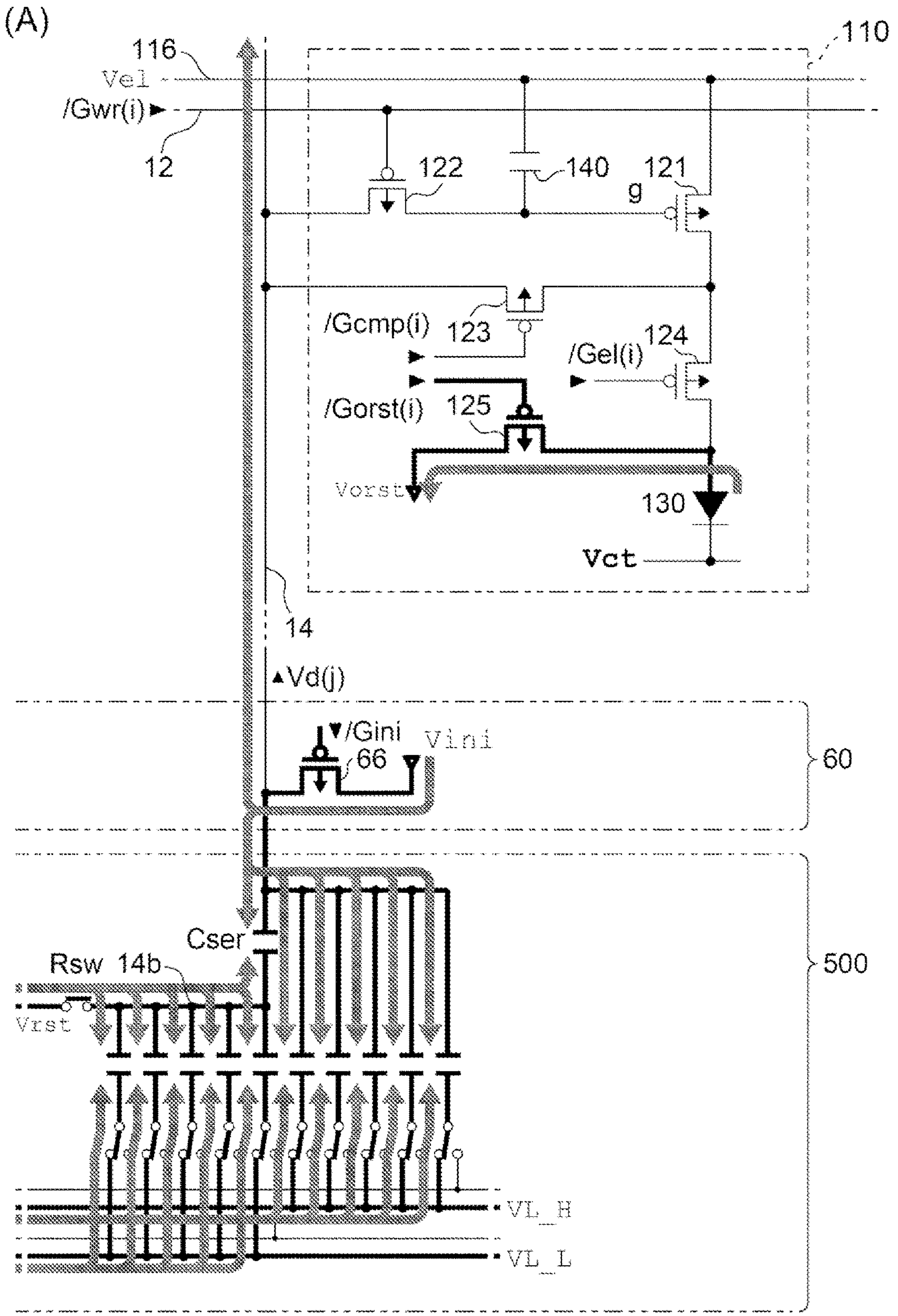
FIG. 7 is a diagram for describing an operation of the electro-optical device.

FIG. 7 is a diagram for describing operations of the pixel circuit 110 at the i-th row and the j-th column and the DA converter circuit 500 corresponding to the data line 14 in the j-th column in the initialization period (A) of the i-th row.

In the initialization period (A), since the transistor 66 is turned on due to the L level of the control signal /Gini, the data line 14 is initialized to the potential Vini. Further, in the initialization period (A), since the switch Rsw is turned on when the control signal /Rst becomes at the L level, the potential Vrst is applied to the relay line 14*b*. In the initialization period (A), the control signal Enb is at the L level, specifically, all of the control signals Enb0 to Enb9 are at the L level.

Regardless of the logic levels of the bits D0 to D9 output from the second latch circuit L2, a logical product signal of each logic circuit Dsl in the selection circuits 510 to 514 becomes at the L level, and a logical product signal of each logic circuit Dsh in the selection circuits 515 to 519 becomes at the L level.

Due to this, each of the selection circuits 510 to 514 selects the potential VL_L, and each of the selection circuits 515 to 519 selects the potential VL_H.

Thus, in the initialization period (A), the potential VL_L is applied to one end of each of the capacitance elements C0 to C4, and the potential VL_H is applied to one end of each of the capacitance elements C5 to C9. In addition, in the initialization period (A), the potential Vrst is applied to the one end of the capacitance element Cser and the other end of each of the capacitance elements C0 to C4, and the potential Vini is applied to the other end of the capacitance element Cser and the other end of each of the capacitance elements C5 to C9 through the data line 14.

Note that the potential Vini is a potential that turns on between the source node and the drain node of the transistor 121 when the potential Vini is supplied to the gate node g of the transistor 121.

In this way, in the initialization period (A), the electric charges accumulated in the capacitance elements C0 to C9 and Cser are initialized together with the initialization of the data line 14.

In addition, in the initialization period (A) of the i-th row, the control signal /Gel(i) becomes at the H level, and the control signal /Gorst(i) becomes at the L level. For this reason, in the pixel circuit 110 in the i-th row, the transistor 124 is turned off and the transistor 125 is turned on, and thus, the potential Vorst is applied to the pixel electrode 131 serving as the anode of the OLED 130. Thus, the OLED 130 is turned off, and the pixel electrode 131 is reset to the potential Vorst.

Note that, because a capacitance is parasitic on the OLED 130, the pixel electrode 131 is reset in order to eliminate an influence of the voltage applied during the light-emitting period performed directly before.

After the initialization period (A), the compensation period (B) starts. The compensation period (B) is a period for converging the gate node g of each transistor 121 to a potential corresponding to a threshold voltage of the transistor 121 (or a potential close to the potential corresponding to the threshold voltage) in the n pixel circuits 110 in the i-th row.

Figure 8:
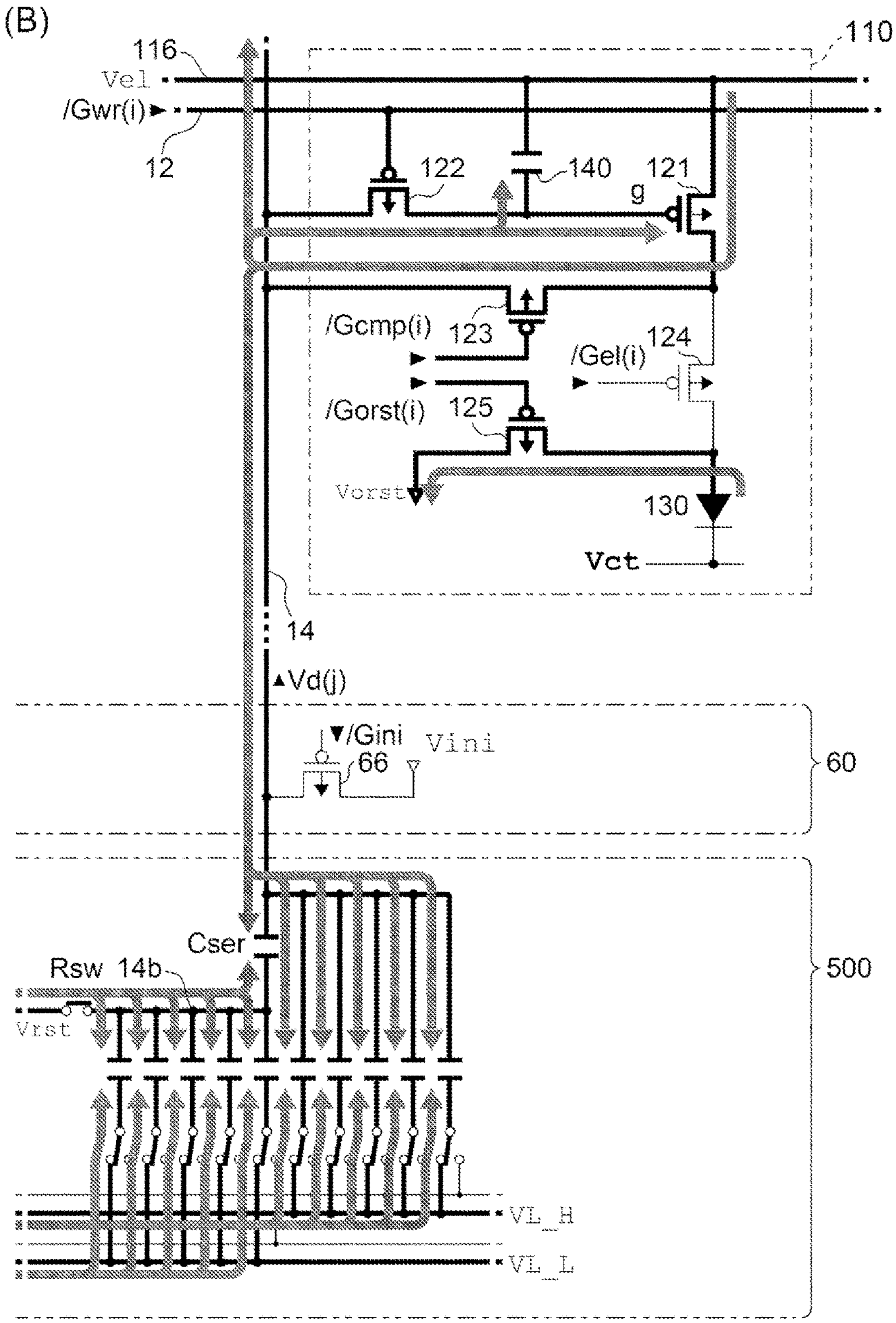
FIG. 8 is a diagram for describing an operation of the electro-optical device.

FIG. 8 is a diagram for describing operations of the pixel circuit 110 at the i-th row and the j-th column and the DA converter circuit 500 corresponding to the data line 14 of the j-th column in the compensation period (B) of the i-th row.

In the compensation period (B), the transistor 66 is turned off due to the H level of the control signal /Gini. Additionally, in the compensation period (B), since the control signal /Rst is at the L level, the switch Rsw is maintained in the on state. Further, since the control signal Enb is at the L level, the selection circuits 510 to 514 maintain the selection of the potential VL_L, and the selection circuits 515 to 519 maintain the selection of the potential VL_H.

In addition, in the compensation period (B) in the i-th row, the scanning signal /Gwr(i) is at the L level, and in the state of the scanning signal /Gwr(i) being in the L level, the control signal /Gcmp(i) is changed to the L level. Thus, in the pixel circuit 110 in the i-th row, the transistor 122 is turned on, and the transistor 123 is turned on, which couples a drain node and a gate node of the transistor 121 to be changed in a diode coupling state.

Since the data line 14 is at the potential Vini in the initialization period (A) before the compensation period (B) and the potential Vini is held by a parasitic capacitance of the data line 14, the transistor 121 is turned on at the start of the compensation period (B). For this reason, at the end of the compensation period (B), the gate node g in the transistor 121 and the data line 14 converge to an equivalent potential to a threshold value (Vel−Vth) equivalent to a threshold voltage Vth of the transistor 121.

Note that at the end of the compensation period (B) of the i-th row, the other end of the capacitance element Cser and the other end of each of the capacitance elements C5 to C9 also converge to the equivalent potential to the threshold value of the transistor 121 through the data line 14.

Further, in the compensation period (B), subsequent to the initialization period (A), the potential VL_L is supplied to the one end of each of the capacitance elements C0 to C4, the potential VL_H is supplied to the one end of each of the capacitance elements C5 to C9, and the potential Vrst is supplied to the one end of the capacitance element Cser and the other end of each of the capacitance elements C0 to C4.

After the end of the compensation period (B) of the i-th row, the writing period (C) of the i-th row starts. The writing period (C) of the i-th row is a period for supplying a potential corresponding to a brightness to the gate node g of each transistor 121 in the pixel circuits 110 of the n columns positioned in the i-th row.

Figure 9:
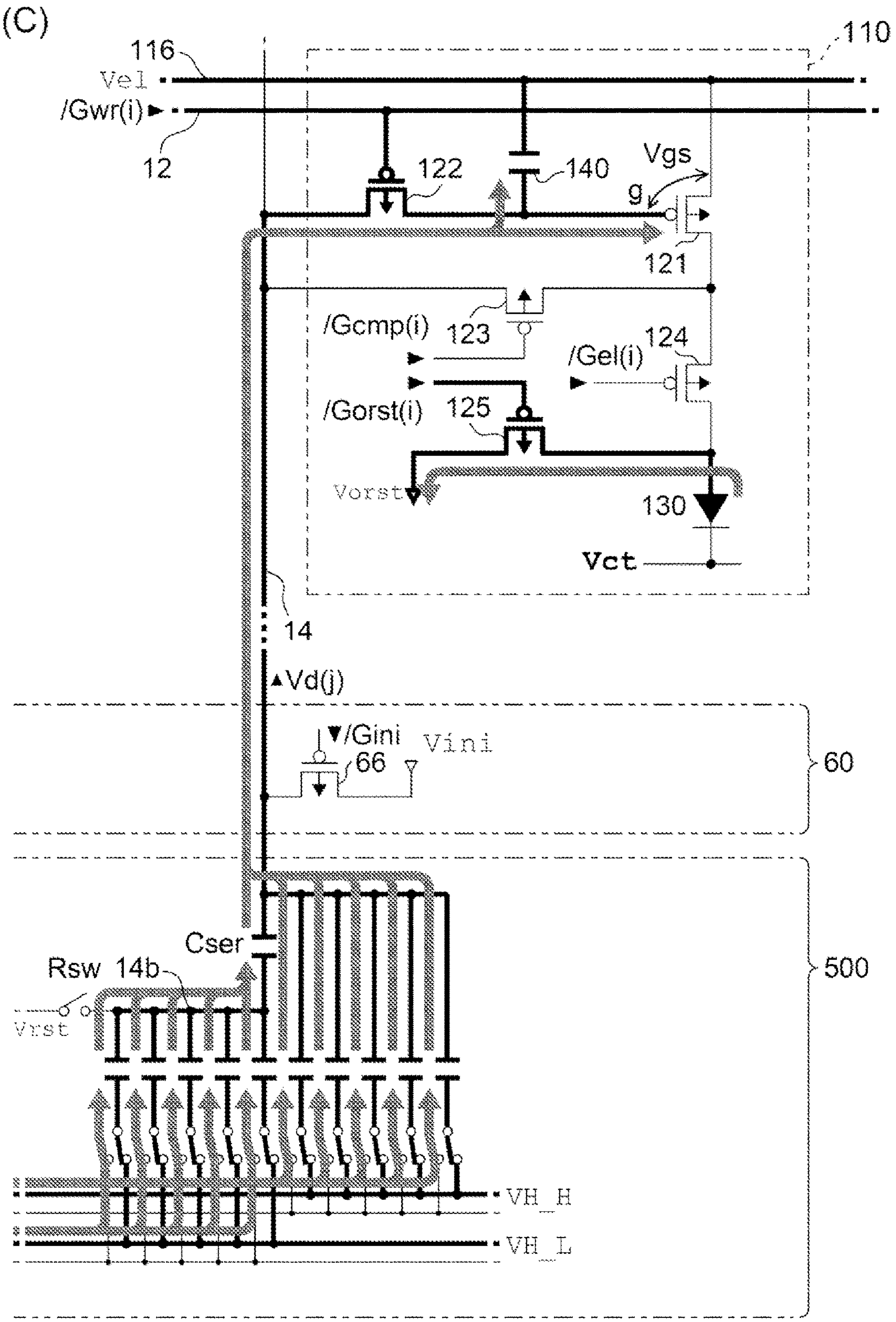
FIG. 9 is a diagram for describing an operation of the electro-optical device.

FIG. 9 is a diagram for describing operations of the pixel circuit 110 at the i-th row and the j-th column and the DA converter circuit 500 corresponding to the data line 14 of the j-th column in the writing period (C) of the i-th row.

In the writing period (C), the control signal /Rst is set to the H level, which changes the switch Rsw to be in the off state.

Further, in the writing period (C), the control signals Enb1 to Enb9 are set to be in a H level in a manner to be sequentially delayed by a period of time ΔT. Note that after the end of the writing period (C), the control signals Enb1 to Enb9 are set to be in a L level in a manner to be sequentially delayed by the time ΔT.

In the writing period (C), a period in which the selection circuit 510 selects the potential VH_L or VL_L according to the bit D0 of the video data output from the second latch circuit L2 in the j-th column is limited by a logic circuit Dsl to a period in which the control signal Enb0 is at an H level. Similarly, a period of the writing period (C) in which the selection circuits 511 to 514 select the potential VH_L or VL_L according to the bits D1 to D4 of the video data output from the second latch circuit L2 in the j-th column is limited to a period in which the control signals Enb1 to Enb4 are at the H level. Similarly, a period of the writing period (C) in which the selection circuits 515 to 519 select the potential VH_H or VL_H according to the bits D5 to D9 of the video data output from the second latch circuit L2 in the j-th column is limited to a period in which the control signals Enb5 to Enb9 are at the H level.

That is, the bits D0 to D9 are not simultaneously taken into the selection circuits 510 to 519 but sequentially delayed by the period of time ΔT and taken into the selection circuits 510 to 519.

Note that of the selection circuits 510 to 514, the selection circuit with the logic circuit Dsl input with a bit of “1” selects the potential VH_L, and the selection circuit with the logic circuit Dsl input with a bit of “0” selects the potential VL_L. Similarly, of the selection circuits 515 to 519, the selection circuit with the logic circuit Dsh input with a bit of “1” selects the potential VH_H, and the selection circuit with the logic circuit Dsh input with a bit of “0” selects the potential VL_H.

In the writing period (C), the voltage at the one end of the capacitance element corresponding to a bit of “0” of the capacitance elements C0 to C9 is not changed from the voltage in the compensation period (B), which does not contribute to the voltage rise of the data line 14.

Of the capacitance elements C5 to C9 corresponding to the five high-order bits, the one end of the capacitance element corresponding to a bit of “1” is changed from the potential VL_H to the potential VH_H in the writing period (C). Thus, the capacitance element corresponding to the bit of “1” of the capacitance elements C5 to C9 increases the potential of the data line 14 from the equivalent potential to the threshold value in the compensation period (B) by an amount according to the weight of the capacitance value.

Of the capacitance elements C0 to C4 corresponding to the five low-order bits, the one end of the capacitance element corresponding the bit of “1” is changed from the potential VL_L to the potential VH_L in the writing period (C). However, unlike the other ends of the capacitance elements C5 to C9, the capacitance element Cser is interposed between the other ends of the capacitance elements C0 to C4 and the data line 14. Thus, a change amount from the potential VL_L to the potential VH_H at the one end of the capacitance element corresponding to the bit of “1” of the capacitance elements C0 to C4 is compressed at the compression ratio kn, resulting in increasing the potential of the data line 14.

In this manner, in the writing period (C), for example, the DA converter circuit 500 in the j-th column increases the potential of the data line 14 in the j-th column from the equivalent potential to the threshold voltage (Vel−Vth) by the potential according to the bits D0 to D9 of the video data Vdata at the i-th row and the j-th column, in other words, by the voltage for specifying the brightness of the OLED at the i-th row and the j-th column.

In the present embodiment, the periods in which the control signals Enb0 to Enb9 are at the H level in the writing period (C) are sequentially delayed by the period of time ΔT. This is because when the control signals Enb0 to Enb9 are simultaneously set to the H level, switching from the potential VL_L to the potential VH_L and switching from the potential VL_H to the potential VH_H occur at the same time, and spike fluctuation accompanying the voltage switching becomes large and propagates to each portion, in particular, propagates to the data line 14, and deteriorates DA conversion accuracy. Thus, in the present embodiment, the phases of the control signals Enb0 to Enb9 are sequentially shifted, and thus the switching of the potentials do not occur at the same time.

According to the present embodiment, since an influence of the voltage fluctuation due to the spike accompanying the voltage switching is reduced, the deterioration of the DA conversion accuracy is suppressed.

Note that the order in which the control signals Enb0 to Enb9 are set to the H level does not need to be the order of the control signals Enb0 to Enb9.

In the writing period (C), in the pixel circuit 110 at the i-th row and the j-th column, since the transistor 122 is turned on and the transistor 123 is turned off, the potential Vd (j) output from the DA converter circuit 500 in the j-th column is supplied to the gate node g of the transistor 121 through the data line 14.

In the figure, a voltage indicating a difference between the voltage of the gate node g and the potential Vel of the source node in the transistor 121 is denoted as Vgs. The voltage Vgs is held in the capacitance element 140.

Note that in the writing period (C) of the i-th row, in the pixel circuit 110 in the i-th row, the transistor 124 continues to be in the off state, and the transistor 125 continues to be in the on state.

Additionally, FIG. 9 illustrates a case where all the bits D0 to D9 of the video data output from the second latch circuit L2 are “1”.

After the end of the writing period (C), the light-emitting period (D) starts. The light-emitting period (D) is a period for causing a current corresponding to the voltage Vgs held in the writing period (C) to flow through the OLED 130 and thus causing light to be emitted.

FIG. 10 is a diagram for describing an operation of the pixel circuit 110 at the i-th row and the j-th column in the light-emitting period (D) of the i-th row.

Before the light-emitting period (D) of the i-th row, the control signal /Gcmp(i) is set to the H level, and thus the transistor 123 is turned off. In addition, when the light-emitting period (D) of the i-th row starts, the control signal/Gel(i) is inverted to the L level, and thus the transistor 124 is turned on. Thus, the transistor 121 causes a current Ids according to the voltage Vgs held by the capacitance element 140 to flow into the OLED 130. Thus, the OLED 130 emits light at a brightness according to the current Ids.

Note that FIG. 6 illustrates an example in which the light-emitting period (D) continues to the start of the horizontal scanning period (H) of the i-th row of the next frame (V) after completing selection of the scanning line 12 of the i-th row. However, the period in which the control signal /Gel(i) is at the L level may be intermittent or may be adjusted according to a brightness of the surrounding environment. Further, the level of the control signal /Gel(i) in the light-emitting period (D) may be increased from the L level in the compensation period (B). In other words, the level of the control signal /Gel(i) in the light-emitting period (D) may be an intermediate level between the H level and the L level.

In the light-emitting period (D) of the i-th row, the DA converter circuit 500 corresponding to the j-th column may perform an operation of the horizontal scanning period (H) for another row other than the i-th row, and thus the DA converter circuit 500 is omitted in FIG. 10.

In the horizontal scanning period (H) of the i-th row, FIG. 7 to FIG. 9 focus on the DA converter circuit 500 corresponding to the j-th column and the pixel circuit 110 at the i-th row and the j-th column. However, operations are similarly performed for the DA converter circuits 500 and the pixel circuits 110 that correspond to the columns other than the j-th column.

Further, FIG. 7 to FIG. 9 focus on the horizontal scanning period (H) of the i-th row, and illustrates the operation of the horizontal scanning period (H). However, the operations are similarly performed sequentially for the horizontal scanning periods (H) in the first, second, third . . . m-th rows.

In the pixel circuit 110, the voltage Vgs in the writing period (C) and the light-emitting period (D) is a voltage that is changed from the threshold voltage in the compensation period (B) according to the gray scale level of the pixel circuit 110. Operations are similarly performed for the other pixel circuits 110. Thus, in the present embodiment, in all the pixel circuits 110 of the m rows and the n columns, currents according to the gray scale levels flow into the OLEDs 130 in a state in which the threshold values of the transistors 121 are compensated. Thus, in the present embodiment, fluctuation in brightness is reduced. As a result, display with high quality can be achieved.

FIG. 11 is a table showing specific examples of the potentials VH_H, VL_H, VH_L, and VL_L by using voltages. Note that these voltages use the L levels of the scanning signal /Gwr(i), the control signals /Gel(i), /Gcmp (i), /Gorst(i), and /Gini, and the L level corresponding to "0" of the bits D0 to D9 as a reference of a voltage of 0.

In the embodiment described above, VH_H is set to 5.0 V, VL_H is set to 1.5 V, VH_L is set to 1.8 V, and VL_H is set to 0 V.

The power supply circuit 15 of the electro-optical device 10 generates power supply voltages for two types of circuits that are a low-voltage circuit and a high-voltage circuit. A relatively high voltage (for example, 6 V) is required to cause the OLED 130 to emit light with a high brightness. Thus, the pixel circuit 110 is driven at such a high voltage.

The capacitance element Cser and the upper DA converter circuit Upb of the DA converter circuit 500 are coupled to the data line 14, and thus need to be designed to withstand a high voltage.

The lower DA converter circuit Lwb of the DA converter circuit 500 is indirectly coupled to the data line 14 via the capacitance element Cser, and thus does not need to withstand a high voltage and may be designed to withstand a relatively low voltage (for example, 1.8 V).

In the DA converter circuit 500, the potentials VH_H and VL_H to be used in the upper DA converter circuit Upb are separately generated using a high voltage (for example, 6 V) generated in the power supply circuit 15.

In the DA converter circuit 500, the potentials VH_L and VL_L to be used in the lower DA converter circuit Lwb are separately generated using the high voltage generated in the power supply circuit 15.

Note that VH_L of 1.8 V is at the same level as a H level of a low-amplitude logic signal. However, a configuration in which the potential VH_L and the H level of the low-amplitude logic signal are commonly used is likely to be affected by noise caused by a change in level of the low-amplitude logic signal. Because of this, the potential VH_L and the H level of the low-amplitude logic signal may be separately generated.

The low-voltage circuit of the DA converter circuit 500 is a circuit surrounded by a dashed line Lvb in FIG. 4, and to be specific, includes the selection circuits 510 to 514, the switch Rsw, the capacitance elements C0 to C4, and the logic circuits Dsh of the selection circuits 515 to 519.

The high-voltage circuit of the DA converter circuit 500 is a circuit other than the circuit surrounded by the dashed line Lvb in FIG. 4, and to be specific, includes the capacitance element Cser, the capacitance elements C5 to C9, and the level shifters Ls and the selectors Sel_H in the selection circuits 515 to 519.

The elements constituting the low-voltage circuit of the DA converter circuit 500 may be designed to withstand the above-described low voltage, whereas the elements constituting the high-voltage circuit of the DA converter circuit 500 need to be designed to withstand the above-described high voltage.

The elements constituting the low-voltage circuit of the DA converter circuit 500 are transistors constituting the selection circuits 510 to 514, transistors constituting the switch Rsw, transistors constituting the logic circuits Dsh in the selection circuits 515 to 519, and the capacitance elements C0 to C4 in FIG. 4.

Of the transistors, the transistors constituting the selection circuits 510 to 514 are, to be specific, transistors constituting each of the NAND circuits Lg11, a transistor constituting each of the NOT circuits Lg12, and transistors constituting the transmission gates Tg11 and Tg12 of each of the selectors Sel_L. Additionally, the transistors constituting the switch Rsw are transistors constituting the transmission gate Tg0 and a transistor constituting the NOT circuit Lg0. The transistors constituting the logic circuits Dsh in the selection circuits 515 to 519 are transistors constituting each NAND circuit Lg21 and a transistor constituting each NOT circuit Lg22.

The elements constituting the high-voltage circuit of the DA converter circuit 500 are the capacitance elements Cser and C5 to C9, transistors constituting the level shifters Ls, and transistors constituting the selectors Sel_H in the selection circuits 515 to 519 in FIG. 4.

Of the elements, the transistors constituting the selectors Sel_H are specifically the transistors constituting the transmission gates Tg21 and Tg22.

Channel lengths of the transistors in the low-voltage circuit are designed to be suitable for a low voltage, and channel lengths of the transistors in the high-voltage circuit are designed to be suitable for a high voltage. With such a design, the channel lengths of the transistors in the high-voltage circuit are longer than the channel lengths of the transistors in the low-voltage circuit.

When the capacitance elements Cser and C0 to C9 are MOS capacitors, thicknesses of the gate insulating layers in the capacitance elements C0 to C4 in the low-voltage circuit are designed to be suitable for the low voltage, and thicknesses of the gate insulating layers in the capacitance elements Cser and C5 to C9 in the high-voltage circuit are designed to be suitable for the high voltage. With such a design, the thicknesses of the gate insulating layers in the capacitance elements C0 to C4 are smaller than the thicknesses of the gate insulating layers in the capacitance elements Cser and C5 to C9.

When the capacitance elements Cser and C0 to C9 are MIM capacitors, thicknesses of the interlayer insulating layers in the capacitance elements C0 to C4 in the low-voltage circuit are designed to be suitable for the low voltage, and thicknesses of the interlayer insulating layers in the capacitance elements Cser and C5 to C9 in the high-voltage circuit are designed to be suitable for the high voltage. With such a design, the thicknesses of the interlayer insulating layers in the capacitance elements C0 to C4 are smaller than the thicknesses of the gate interlayer films in the capacitance elements Cser and C5 to C9.

FIG. 12 is a partial cross-sectional view illustrating the capacitance elements C0 to C4 with the semiconductor substrate taken along the X direction.

The electro-optical device 10 according to the present embodiment is formed at the semiconductor substrate, and in the figure, layers used as conductive layers or wiring line layers are six layers in total including a semiconductor layer 210, a gate electrode layer 220, a first wiring line layer 230, a second wiring line layer 240, a third wiring line layer 250, and a fourth wiring line layer 260 in order from a base material. Note that although a reflective electrode layer, a conductive layer of the pixel electrode 131, and the like are further provided in practice, illustration of the fourth wiring line layer 260 and subsequent layers is omitted.

As illustrated in the figure, the capacitance element C has a configuration in which a gate insulating layer 280 is sandwiched between the electrode 211 constituted by the semiconductor layer 210 and the electrode 221 formed by patterning the gate electrode layer 220. In other words, the gate insulating layer 280 is provided between the electrode 211 and the electrode 221.

Note that a thickness of the gate insulating layer 280 in a direction perpendicular to the semiconductor substrate is denoted by dg. The electrode 211 is formed by, for example, injecting impurity ions into a p-well region Well. Additionally, a region St is a trench for separating regions of adjacent elements.

The electrode 211 is coupled to a wiring line 231 through a contact hole Ct1 formed by opening the gate insulating layer 280 and a first interlayer insulating layer 281. The electrode 221 is coupled to a wiring line 232 through a contact hole Ct2 formed by opening the first interlayer insulating layer 281.

Note that although portions of the electrode 211 coupled to the contact hole Ct2 are separated from each other in the figure, the portions are cut out in plan view and are actually integrated. In addition, the electrode 211 is electrically coupled to, for example, an output terminal of the selector Sel_L through another wiring line and another contact hole (not illustrated), and the electrode 221 is electrically coupled to the relay line 14*b* through another wiring line and another contact hole (not illustrated).

The first interlayer insulating layer 281 is an insulating layer provided between the gate electrode layer 220 and the first wiring line layer 230. The wiring lines 231 and 232 are formed by patterning the first wiring line layer 230 and are for relay.

A second interlayer insulating layer 282 is provided between the first wiring line layer 230 and the second wiring line layer 240. A wiring line 241 is formed by patterning the second wiring line layer 240. The wiring line 241 is coupled to a wiring line 251 through a contact hole Ct3 formed by opening a third interlayer insulating layer 283.

The third interlayer insulating layer 283 is an insulating layer provided between the second wiring line layer 240 and the third wiring line layer 250. A wiring line 252 is formed by patterning the third wiring line layer 250 together with the wiring line 251.

The wiring line 251 is coupled to a wiring line 261 through a contact hole Ct4 formed by opening a fourth interlayer insulating layer 284. The fourth interlayer insulating layer 284 is an insulating layer provided between the third wiring line layer 250 and the fourth wiring line layer 260. The wiring line 261 is formed by patterning the fourth wiring line layer 260 together with the data line 14.

In the example illustrated in the figure, the wiring lines 241, 251, and 261 are electrically coupled to each other and maintained at a constant potential. Thus, the wiring lines 241, 251, and 261 have a function of shielding the data line 14 in a flat surface direction and a vertical direction of the semiconductor substrate.

Note that although FIG. 12 illustrates the structure of the capacitance element C with a low withstand voltage, in the structures of the capacitance elements Cser and C5 to C9 with a high withstand voltage, the thickness dg of the gate electrode layer 220 sandwiched between the electrodes 211 and 221 is larger than the thickness dg of the gate electrode layer 220 in the capacitance element with the low withstand voltage.

The capacitance element C has been used for general description without specifying any one of the capacitance elements C0 to C4 with the low withstand voltage and the capacitance elements Cser and C5 to C9 with the high withstand voltage. In addition, one of the electrodes 211 and 221 in the capacitance elements C5 to C9 corresponds to a "first electrode" and the other thereof corresponds to a "second electrode" in the claims. One of the electrodes 211 and 221 in the capacitance elements C0 to C4 corresponds to a "third electrode" and the other thereof corresponds to a "fourth electrode" in the claims.

In addition, the thicknesses dg of the gate insulating layers in the capacitance elements C0 to C4 are equal to each other. A capacitance value of each of the capacitance elements C0 to C4 is determined by an area of a region where the electrodes 211 and 221 overlap each other in plan view. Similarly, the thicknesses of the gate insulating layers in the capacitance elements C5 to C9 are equal to each other. A capacitance value of each of the capacitance elements C5 to C9 is determined by an area of a region where the electrodes 211 and 221 overlap each other in plan view.

Note that in the present embodiment, a capacitance value of the capacitance element C0 is equal to a capacitance value of the capacitance element Cser, but the capacitance element C0 has a low withstand voltage and the capacitance element Cser has a high withstand voltage. Thus, the area of the region where the electrodes 211 and 221 overlap each other in plan view in the capacitance element C0 is smaller than the area of the region where the electrodes 211 and 221 overlap each other in plan view in the capacitance element Cser in consideration of a reduction in the thickness dg of the gate insulating layer.

Figure 13:
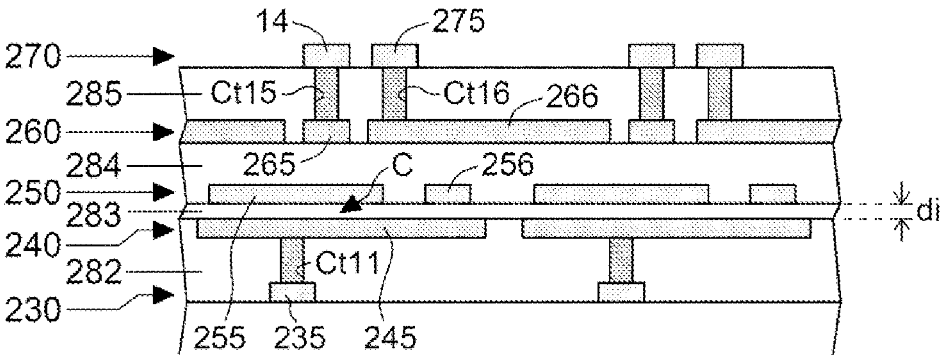
FIG. 13 is a partial cross-sectional view illustrating another example of the capacitance element in the electro-optical device.

FIG. 13 is a partial cross-sectional view illustrating the semiconductor substrate including the capacitance element C when the capacitance element C is constituted by an MIM capacitor, the semiconductor substrate being cut along the X direction.

Note that in FIG. 13, in contrast to FIG. 12, a fifth interlayer insulating layer 285 is provided in such a manner as to cover the fourth wiring line layer 260, and a fifth wiring line layer 270 is provided in such a manner as to cover the fifth interlayer insulating layer 285. Further, in FIG. 13, layers below the third wiring line layer 250 and layers above the fifth wiring line layer 270 are omitted.

As illustrated in the figure, the capacitance element C has a configuration in which the third interlayer insulating layer 283 is sandwiched between an electrode 245 formed by patterning the second wiring line layer 240 and an electrode 255 formed by patterning the third wiring line layer 250.

Note that a thickness of the third interlayer insulating layer 283 in the direction perpendicular to the semiconductor substrate is denoted by di.

The electrode 245 is coupled to the wiring line 235 through a contact hole Ct11 formed by opening the second interlayer insulating layer 282. Note that the wiring line 235 is formed by patterning the first wiring line layer 230 and is electrically coupled to, for example, the output terminal of the selector Sel_L.

The electrode 255 is electrically coupled to the relay line 14*b* through another wiring line and another contact hole. A wiring line 256 is formed together with the electrode 255 by patterning the third wiring line layer 250. The wiring line 256 is maintained at a constant potential, for example, to shield the electrode 255 from noise. The wiring line 256 is disposed in a manner to overlap the electrode 245 in plan view. Alternatively, the wiring line 256 may be disposed in a manner to overlap a wiring line extending from the electrode 245 in the second wiring line layer 240.

Further, a wiring line 265 and a wiring line 266 are formed by patterning the fourth wiring line layer 260. The wiring line 265 is coupled to the data line 14 through a contact hole Ct15 formed by opening the fifth interlayer insulating layer 285, and the wiring line 266 is coupled to a wiring line 275 through a contact hole Ct16 formed by opening the fifth interlayer insulating layer 285. The data line 14 and the wiring line 275 are formed by patterning the fifth wiring line layer. Note that the wiring lines 266 and 275 are maintained at a constant potential, for example, to shield the data line 14 and the wiring line 265 from noise.

Note that although FIG. 13 illustrates the structure of the capacitance element C with the low withstand voltage, in each of the structures of the capacitance elements Cser and C5 to C9 with the high withstand voltage, the thickness di of the third interlayer insulating layer 283 sandwiched between the electrodes 245 and 255 is larger than the thickness di of the third interlayer insulating layer 283 in the capacitance element with the low withstand voltage. Additionally, the capacitance values of the capacitance elements C0 to C4 with the low withstand voltage are determined by the area of the region where the electrodes 245 and 255 overlap each other in plan view, as in the case of the MOS capacitor.

Advantages of the electro-optical device 10 according to the present embodiment, in particular, the DA converter circuit 500, will be described using a comparative example.

Figure 16:
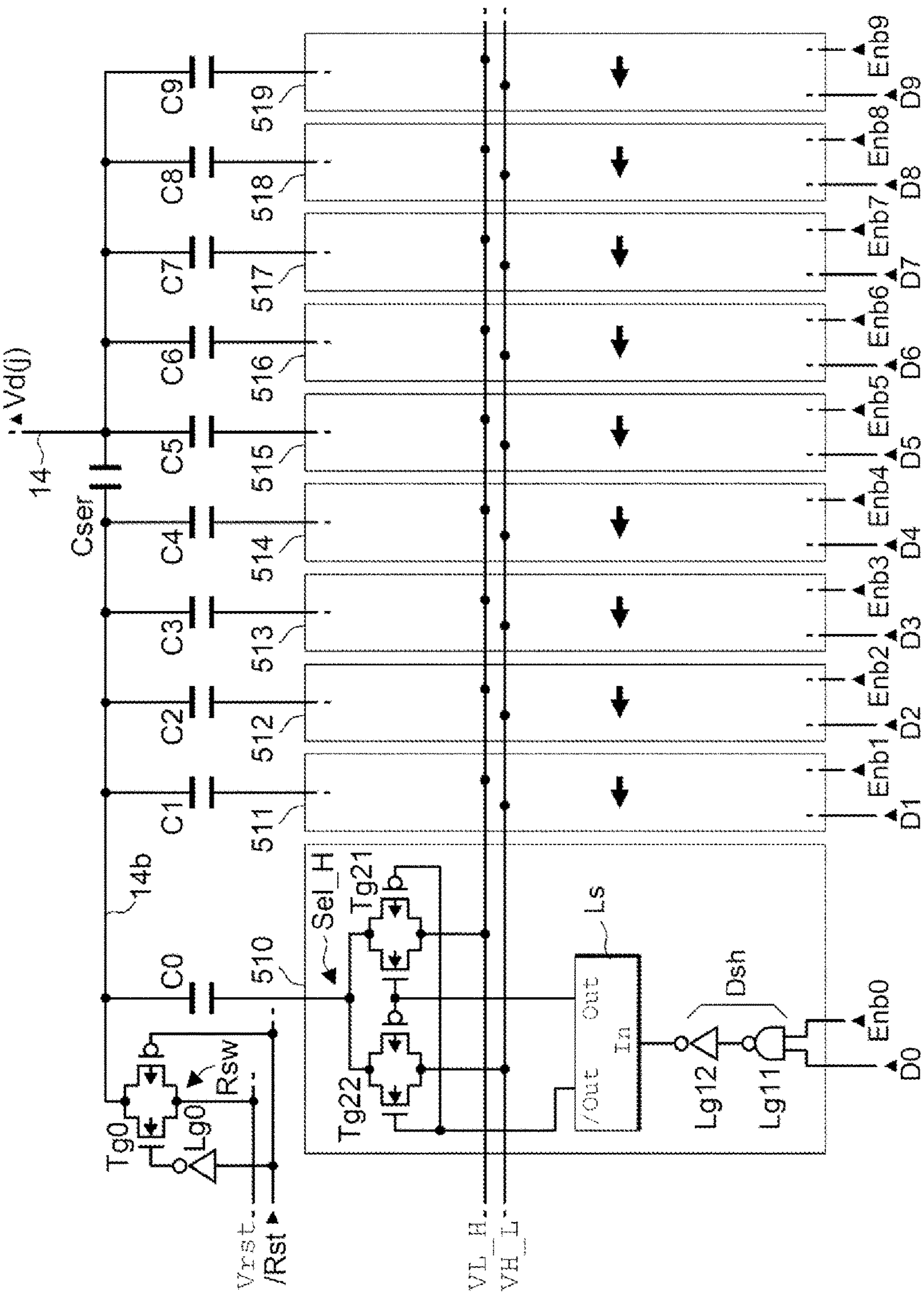
FIG. 16 is a circuit diagram illustrating a DA converter circuit according to a comparative example.

FIG. 16 is a circuit diagram illustrating a DA converter circuit according to the comparative example.

In the comparative example, the potentials VH and VL are commonly used by the lower DA converter circuit Lwb and the upper DA converter circuit Upb. Thus, the elements constituting the DA converter circuit in the comparative example need to have a high withstand voltage to be suitable for a high voltage.

Of the elements with the high withstand voltage, a capacitance element has a thick insulating layer, and thus has a small capacitance value per unit area. Thus, an area of electrodes sandwiching the insulating layer needs to be widened, and thus the necessary capacitance value can be secured.

In addition, driving the transistor with the high withstand voltage constituting the selector Sel that selects the potential VH or VL requires a level shifter Ls that is used for converting a low-amplitude logic signal into a high-amplitude logic signal in each of both the lower DA converter circuit Lwb and the upper DA converter circuit Upb. Since a transistor constituting the level shifter Ls is also required to have a high withstand voltage, a size of the transistor is increased, which increases a circuit area and enlarges a chip area. Thus, it is difficult to achieve miniaturization.

On the other hand, in the present embodiment, the potentials VH_L and VL_L used in the lower DA converter circuit Lwb and the potentials VH_H and VL_H used in the upper DA converter circuit Upb are separated from each other, and amplitudes of the potentials VH_L and VL_L are lower than amplitudes of the potentials VH_H and VL_H. Thus, in the present embodiment, withstand voltages of the constituent elements of the lower DA converter circuit Lwb do not need to be made high.

Because of this, according to the present embodiment, since the thickness of the insulating layer of the capacitance element constituting the lower DA converter circuit Lwb can be made thinner than the thickness of the insulating layer of the capacitance element constituting the upper DA converter circuit Upb, which makes it is possible to increase the capacitance value per unit area. In addition, in the present embodiment, the transistor constituting the lower DA converter circuit Lwb can be made smaller than the transistor constituting the upper DA converter circuit Upb, and the level shifter Ls does not need to be used in the lower DA converter circuit Lwb.

As a result, in the present embodiment, the circuit area in the entire DA converter circuit 500 can be minimized as compared with the comparative example.

In the present embodiment described above, various modifications or applications can be made as will be described below.

In the present embodiment, all of the potentials VH_H, VL_H, VH_L, and VL_L are different from each other. However, some of the potentials may be made in common.

For example, as illustrated in Modification 1 in FIG. 11, the potentials VH_H, VL_H, VH_L, and VL_L may be set to 5.0 V, 0 V, 1.8 V, and 0 V in this order, respectively.

In Modification 1, since the low potential of the high-voltage circuit and the low potential of the low-voltage circuit are made common at 0 V, the number of potentials to be generated by the power supply circuit 15 for the DA converter circuit 500 can be reduced from "4" to "3". Thus, according to Modification 1, as compared with the embodiment, it is possible to simplify a circuit configuration and reduce the number of mounting terminals according to the reduction in the number of potentials.

Note that when the power supply circuit 15 generates a certain potential, an external capacitance element needs to be mounted, which smooths the potential. The mounting terminal is a terminal configured to couple the capacitance element for the smoothing.

Alternatively, for example, as illustrated in Modification 2 in FIG. 11, the potentials VH_H, VL_H, VH_L, and VL_L may be set to 5.0 V, 1.8 V, 1.8 V, and 0 V in this order, respectively.

In Modification 2, since the low potential of the high-voltage circuit and the high potential of the low-voltage circuit are made common at 1.8 V, the number of potentials to be generated by the power supply circuit 15 for the DA converter circuit 500 can be reduced from "4" to "3". Thus, according to Modification 2, as in Modification 1, a circuit configuration can be simplified and the number of mounting terminals can be reduced according to the reduction in the number of potentials.

In the embodiment and the like, description has been made with the OLED 130 illustrated as an example of a light-emitting element. However, other light-emitting elements may be used. For example, an LED may be used as the light-emitting element, or a liquid crystal element in combination with an illumination mechanism. In other words, as the light-emitting element, an electro-optical element in an optical state according to the potential of the data line 14 may be adopted.

In the embodiment and the like, an example of conversion of the 10 bits has been given as the DA converter circuit 500. However, the embodiment and the like are not limited thereto.

The channel types of the transistors 66, 121 to 124, and the like are not limited to those in the embodiment and the like. Further, the channels of those transistors and the like may be changed as appropriate, and those transistors and the like may be replaced with a transmission gate as appropriate.

Next, an electronic apparatus to which the electro-optical device 10 according to the embodiment and the like is applied will be described. The electro-optical device 10 is suitable for application with a small pixel and high definition display. Therefore, a head-mounted display will be described as an example of the electronic apparatus.

Figure 14:
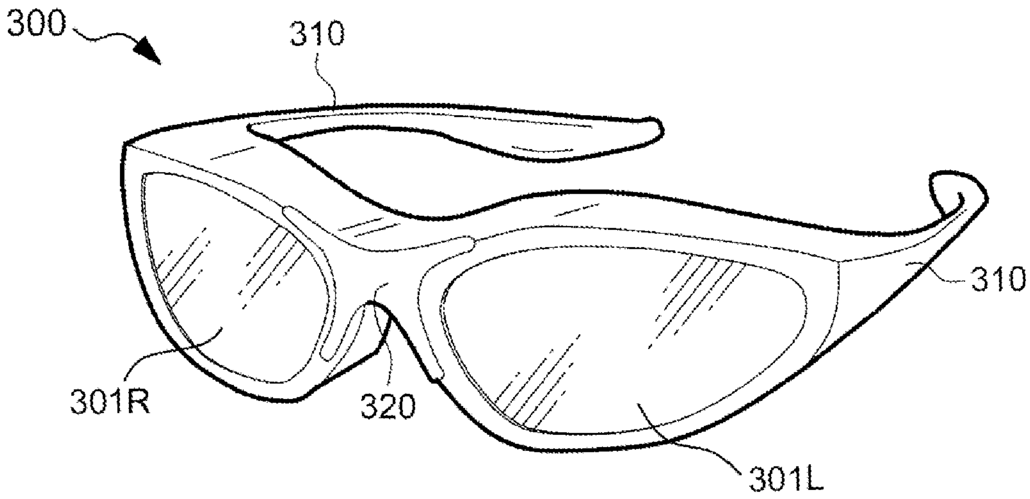
FIG. 14 is a perspective view illustrating a head-mounted display using the electro-optical device.
Figure 15:
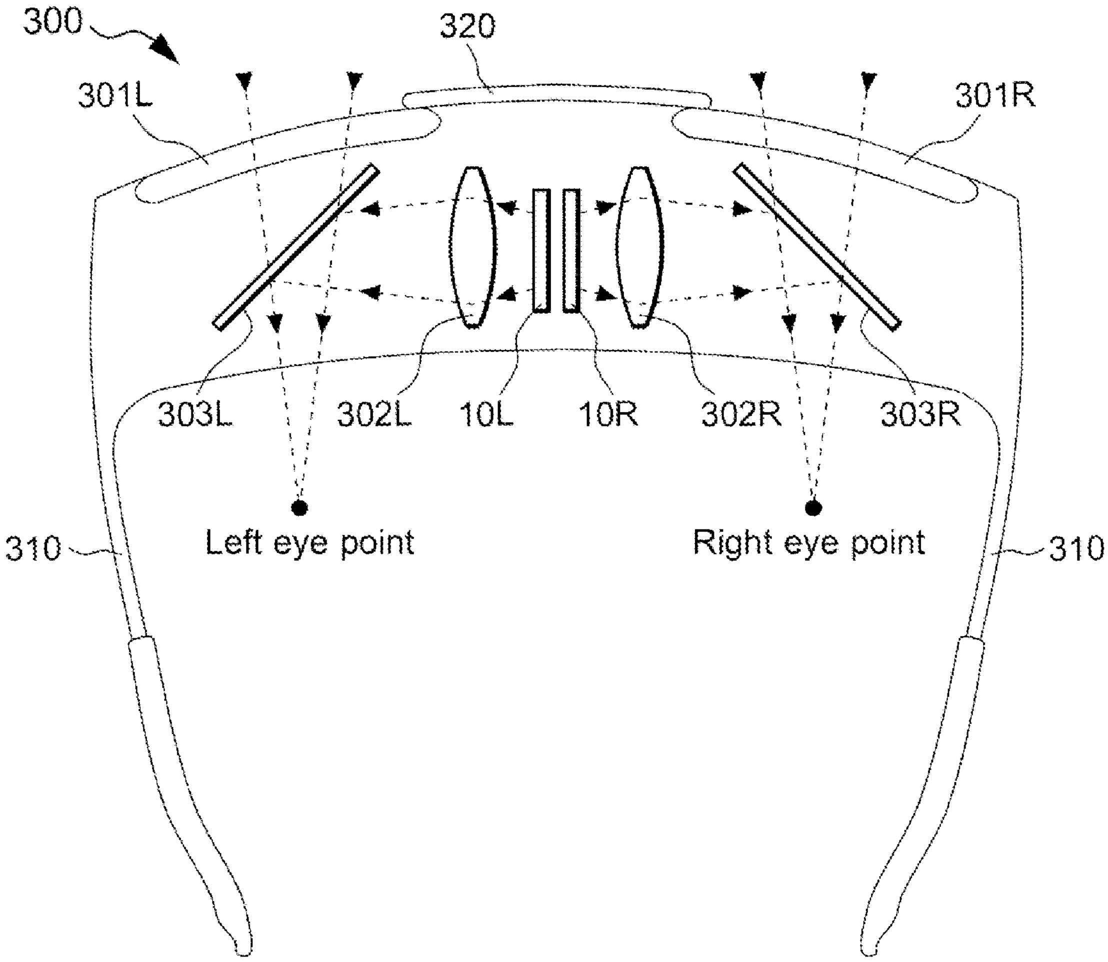
FIG. 15 is a diagram illustrating an optical configuration of the head-mounted display.

FIG. 14 is a diagram illustrating appearance of a head-mounted display, and FIG. 15 is a diagram illustrating an optical configuration thereof.

First, as illustrated in FIG. 15, a head-mounted display 300 includes, in terms of exterior, temples 310, a bridge 320, and lenses 301L and 301R, similar to typical eyeglasses. In addition, as illustrated in FIG. 15, in the head-mounted display 300, an electro-optical device 10L for a left eye and an electro-optical device 10R for a right eye are provided in the vicinity of the bridge 320 and on the back side (the lower side in the figure) of the lenses 301L and 301R.

An image display surface of the electro-optical device 10L is arranged to be on the left side in FIG. 15. Thus, a display image by the electro-optical device 10L is output through an optical lens 302L in a 9-o'clock direction in the figure. A half mirror 303L reflects the display image by the electro-optical device 10L in a 6-o'clock direction, while the half mirror 303L transmits light incident from a 12-o'clock direction. An image display surface of the electro-optical device 10R is arranged on the right side opposite to the electro-optical device 10L. Thus, the display image by the electro-optical device 10R is output through the optical lens 302R in a 3-o'clock direction in the figure. A half mirror 303R reflects the display image by the electro-optical device 10R in a 6-o'clock direction, while the half mirror 303R transmits light incident from a 12-o'clock direction.

In this configuration, a wearer of the head-mounted display 300 can observe the display images by the electro-optical devices 10L and 10R in a see-through state in which the display images by the electro-optical devices 10L and 10R overlap the outside.

In addition, in the head-mounted display 300, in the images for both eyes with parallax, an image for a left eye is displayed on the electro-optical device 10L, and an image for a right eye is displayed on the electro-optical device 10R, and thus, it is possible to cause the wearer to sense the displayed images as an image displayed having a depth or a three-dimensional effect.

In addition to the head-mounted display 300, the electronic apparatus including the electro-optical device 10 can be applied to an electronic viewing finder in a video camera, a lens-exchangeable digital camera, or the like, a personal digital assistant, a wristwatch display, a light valve for a projection type projector, and the like.

For example, the following aspects will be understood from the embodiment and the modifications described above as the examples.

A DA converter circuit according to an aspect (first aspect) includes a first DA converter circuit including a first capacitance element, the first DA converter circuit being configured to output a voltage corresponding to a high-order bit of a plurality of bits to a first data line, a second DA converter circuit including a second capacitance element, the second DA converter circuit being configured to output a voltage corresponding to a low-order bit of the plurality of bits to a second data line, and a coupling capacitor including one end coupled to the second data line and the other end coupled to the first data line. The first capacitance element includes a first electrode electrically coupled to the first data line, a second electrode, and a first insulating layer provided between the first electrode and the second electrode. The second capacitance element includes a third electrode electrically coupled to the second data line, a fourth electrode, and a second insulating layer provided between the third electrode and the fourth electrode and having a thickness smaller than a thickness of the first insulating layer.

According to the first aspect, a withstand voltage of the second capacitance element is lower than a withstand voltage of the first capacitance element, which can reduce a circuit area.

Note that the upper DA converter circuit Upb is an example of the first DA converter circuit, the lower DA converter circuit Lwb is an example of the second DA converter circuit, and the capacitance element Cser is an example of the coupling capacitor. Additionally, the capacitance element C5 is an example of the first capacitance element, and the capacitance element C0 is an example of the second capacitance element.

In a DA converter circuit according to a second specific aspect of the first aspect, the first capacitance element is provided corresponding to one bit of the high-order bits, the second capacitance element is provided corresponding to one bit of the low-order bits, a low-amplitude logic signal corresponding to the one bit of the high-order bits is converted into a high-amplitude logic signal by a level shifter and supplied to the other end of the first capacitance element, and a low-amplitude logic signal corresponding to the one bit of the low-order bits is supplied to the other end of the second capacitance element.

According to the second aspect, the upper DA converter circuit is provided with a level shifter, but the lower DA converter circuit is not provided with a level shifter. Thus, the circuit area can be accordingly reduced.

In a DA converter circuit according to a third specific aspect of the second aspect, a withstand voltage of a transistor that selects and supplies a high level of the low-amplitude logic signal or a low level of the low-amplitude logic signal to the other end of the second capacitance element is lower than a withstand voltage of a transistor that selects and supplies a high level of the high-amplitude logic signal or a low level of the high-amplitude logic signal to the other end of the first capacitance element.

According to the third aspect, since the withstand voltage of the transistor that selects and supplies the high level or the low level of the low-amplitude logic signal to the other end of the second capacitance element is lower than the withstand voltage of the transistor that selects and supplies the high level or the low level of the high-amplitude logic signal to the other end of the first capacitance element, which can accordingly reduce the circuit area.

In a DA converter circuit according to a fourth specific aspect of the third aspect, a difference between the high level of the high-amplitude logic signal and the low level of the high-amplitude logic signal is different from a difference between the high level of the low-amplitude logic signal and the low level of the low-amplitude logic signal.

In a DA converter circuit according to a fifth specific aspect of the fourth aspect, the low level of the high-amplitude logic signal and the low level of the low-amplitude logic signal are common. According to the fifth aspect, since the potential is made common, a configuration of a power supply circuit that generates a plurality of potentials can be simplified and the circuit area can be reduced.

In a DA converter circuit according to a sixth specific aspect of the fourth aspect, the low level of the high-amplitude logic signal and the high level of the low-amplitude logic signal are common. According to the sixth aspect, since the potential is made common, a configuration of a power supply circuit that generates a plurality of potentials can be simplified and the circuit area can be reduced.

An electro-optical device according to a seventh aspect includes the DA converter circuit according to any one of the first to sixth aspects, a scanning line, and a pixel circuit provided corresponding to the scanning line and the first data line and including an electro-optical element configured to have brightness corresponding to a potential of the first data line in a writing period of a horizontal scanning period in which the scanning line is selected.

According to the seventh aspect, a circuit area of the electro-optical device can be reduced.

An electronic apparatus according to an eighth aspect includes the electro-optical device according to the seventh aspect. According to the eighth aspect, the electro-optical device can be easily miniaturized.

What is claimed is:

1. A DA converter circuit comprising:

a first DA converter circuit including a first capacitance element, the first DA converter circuit being configured to output a voltage corresponding to a high-order bit of a plurality of bits to a first data line;

a second DA converter circuit including a second capacitance element, the second DA converter circuit being configured to output a voltage corresponding to a low-order bit of the plurality of bits to a second data line; and a coupling capacitor including one end coupled to the second data line and the other end coupled to the first data line, wherein the first capacitance element includes a first electrode electrically coupled to the first data line, a second electrode, and a first insulating layer provided between the first electrode and the second electrode, and the second capacitance element includes a third electrode electrically coupled to the second data line, a fourth electrode, and a second insulating layer provided between the third electrode and the fourth electrode and having a thickness smaller than a thickness of the first insulating layer.

2. The DA converter circuit according to claim 1, wherein the first capacitance element is provided corresponding to one bit of the high-order bits, the second capacitance element is provided corresponding to one bit of the low-order bits, a low-amplitude logic signal corresponding to the one bit of the high-order bits is converted into a high-amplitude logic signal by a level shifter and supplied to the other end of the first capacitance element, and a low-amplitude logic signal corresponding to the one bit of the low-order bits is supplied to the other end of the second capacitance element.

3. The DA converter circuit according to claim 2, wherein a withstand voltage of a transistor configured to select and supply a high level of the low-amplitude logic signal or a low level of the low-amplitude logic signal to the other end of the second capacitance element is lower than a withstand voltage of a transistor configured to select and supply a high level of the high-amplitude logic signal or a low level of the high-amplitude logic signal to the other end of the first capacitance element.

4. The DA converter circuit according to claim 3, wherein a difference between the high level of the high-amplitude logic signal and the low level of the high-amplitude logic signal is different from a difference between the high level of the low-amplitude logic signal and the low level of the low-amplitude logic signal.

5. The DA converter circuit according to claim 4, wherein the low level of the high-amplitude logic signal and the low level of the low-amplitude logic signal are common.

6. The DA converter circuit according to claim 4, wherein the low level of the high-amplitude logic signal and the high level of the low-amplitude logic signal are common.

7. An electro-optical device comprising:

the DA converter circuit according to claim 1;

a scanning line; and a pixel circuit provided corresponding to the scanning line and the first data line, and including an electro-optical element configured to have brightness corresponding to a potential of the first data line in a writing period of a horizontal scanning period in which the scanning line is selected.

8. An electronic apparatus comprising:

the electro-optical device according to claim 7.

* * * * *